US012769554B2

(12) United States Patent
Shen et al.

(10) Patent No.: US 12,769,554 B2
(45) Date of Patent: Oct. 20, 2026

(54) PRE-PROCESSED OPERAND DATA BUFFER

(71) Applicant: Arm Limited, Cambridge (GB)

(72) Inventors: Xiaoyang Shen, Valbonne (FR); Cédric Denis Robert Airaud, Saint Laurent du Var (FR); Shun Wan, Cambridge (GB); Zichao Xie, Cambourne (GB); Jun Huang, Cambridge (GB)

(73) Assignee: Arm Limited, Cambridge (GB)

( * ) Notice: Subject to any disclaimer, the term of this patent is extended or adjusted under 35 U.S.C. 154(b) by 313 days.

(21) Appl. No.: 18/396,225

(22) Filed: Dec. 26, 2023

(65) Prior Publication Data

US 2025/0208874 A1 Jun. 26, 2025

(51) Int. Cl.
*G06F 9/38* (2018.01)
*G06F 9/30* (2018.01)

(52) U.S. Cl.
CPC .......... *G06F 9/3832* (2013.01); *G06F 9/3838* (2013.01); *G06F 9/384* (2013.01); *G06F 9/3854* (2023.08); *G06F 9/30123* (2013.01)

(58) Field of Classification Search
CPC ...... G06F 9/3832; G06F 9/3838; G06F 9/384; G06F 9/3826; G06F 9/3836
See application file for complete search history.

(56) References Cited

U.S. PATENT DOCUMENTS

2004/0255099 A1* 12/2004 Kromer ................. G06F 9/3826 712/E9.046
2008/0177983 A1* 7/2008 Piry ...................... G06F 9/3842 712/E9.05
2013/0138925 A1 5/2013 Hickey et al.
2014/0095814 A1 4/2014 Marden et al.
(Continued)

OTHER PUBLICATIONS

Dean M. Tullsen and John S. Seng, "Storageless Value Prediction Using Prior Register Values", May 1, pp. 270-279 (Year: 1999).*
(Continued)

*Primary Examiner* — Courtney P Spann
(74) *Attorney, Agent, or Firm* — NIXON & VANDERHYE P.C.

(57) ABSTRACT

Execution circuitry executes, in response to an instruction referencing a given source register of a register file, a data processing operation on pre-processed operand data obtained after a pre-processing action has been performed using stored operand data from the given source register of the register file. A buffer separate from the register file stores pre-processed operand data corresponding to a subset of registers. Register reuse detection circuitry detects a register reuse opportunity for a subsequent instruction referencing a reused source register also referenced by a previous instruction for which pre-processed operand data corresponding to the reused source register was written to the buffer, when it is guaranteed that no intervening instruction will cause a write to the reused source register. In response to detecting the register reuse opportunity, the data processing operation for the subsequent instruction can be performed using the pre-processed operand data stored in the buffer corresponding to the reused source register, and the pre-processing action is suppressed in relation to stored operand data from the reused source register.

19 Claims, 10 Drawing Sheets

(56) References Cited

U.S. PATENT DOCUMENTS

| | | | | |
|---|---|---|---|---|
| 2015/0058572 | A1* | 2/2015 | Olson | G06F 9/383 711/125 |
| 2021/0173650 | A1 | 6/2021 | Gutierrez et al. | |
| 2023/0104845 | A1* | 4/2023 | Ray | G06F 7/08 711/126 |
| 2024/0111535 | A1* | 4/2024 | Burky | G06F 9/3856 |

OTHER PUBLICATIONS

Combined Search and Examination Report for GB Application No. 2402995.1 dated Sep. 6, 2024, 6 pages.

* cited by examiner

PRE-PROCESSED OPERAND DATA BUFFER

BACKGROUND

Technical Field

The present technique relates to the field of data processing.

Technical Background

A data processing apparatus may have a register file comprising registers for storing operand data for instructions, and execution circuitry to execute data processing operations using the stored operand data from a given register referenced as a source register.

SUMMARY

At least some examples of the present technique provide an apparatus comprising:

- a register file comprising a plurality of registers to store operand data for instructions;
- execution circuitry to execute, in response to an instruction which references a given source register, a data processing operation on pre-processed operand data obtained after a pre-processing action has been performed using stored operand data from the given source register of the register file;
- a pre-processed operand data buffer separate from the register file, the pre-processed operand data buffer being accessible to the execution circuitry and configured to store pre-processed operand data corresponding to a subset of the plurality of registers; and
- register reuse detection circuitry to:
  - detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register; and
  - in response to detecting the register reuse opportunity, control the execution circuitry to execute the data processing operation for the subsequent instruction using the pre-processed operand data stored in the pre-processed operand data buffer corresponding to the reused source register, and suppress the pre-processing action from being performed for the subsequent instruction in relation to stored operand data from the reused source register of the register file.

At least some examples of the present technique provide an apparatus comprising:

- register rename circuitry to perform register renaming to map architectural register identifiers specified by instructions to physical register identifiers indicative of corresponding portions of hardware register storage;
- register reclaim circuitry to determine when a previously allocated physical register identifier is free to be re-allocated to a new architectural register identifier specified by an instruction awaiting renaming;
- reclaim delaying circuitry, responsive to the register reclaim circuitry indicating that a given physical register identifier is free to be re-allocated, to prevent the given physical register identifier actually being re-allocated during a protection delay period following the register reclaim circuitry indicating that the given physical register identifier is free to be re-allocated; and
- protection delay period adjustment circuitry to dynamically adjust a duration of the protection delay period based on at least one feedback indication.

At least some examples of the present technique provide a system comprising:

- the apparatus as in either of the two examples described above, implemented in at least one packaged chip;
- at least one system component; and
- a board,
- wherein the at least one packaged chip and the at least one system component are assembled on the board.

At least some examples of the present technique provide a chip-containing product comprising the system described above assembled on a further board with at least one other product component.

At least some examples provide a non-transitory computer-readable medium to store computer-readable code for fabrication of an apparatus comprising:

- a register file comprising a plurality of registers to store operand data for instructions;
- execution circuitry to execute, in response to an instruction which references a given source register, a data processing operation on pre-processed operand data obtained after a pre-processing action has been performed using stored operand data from the given source register of the register file;
- a pre-processed operand data buffer separate from the register file, the pre-processed operand data buffer being accessible to the execution circuitry and configured to store pre-processed operand data corresponding to a subset of the plurality of registers; and
- register reuse detection circuitry to:
  - detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register; and
  - in response to detecting the register reuse opportunity, control the execution circuitry to execute the data processing operation for the subsequent instruction using the pre-processed operand data stored in the pre-processed operand data buffer corresponding to the reused source register, and suppress the pre-processing action from being performed for the subsequent instruction in relation to stored operand data from the reused source register of the register file.

Further aspects, features and advantages of the present technique will be apparent from the following description of examples, which is to be read in conjunction with the accompanying drawings.

DESCRIPTION OF EXAMPLES

Figure 1:
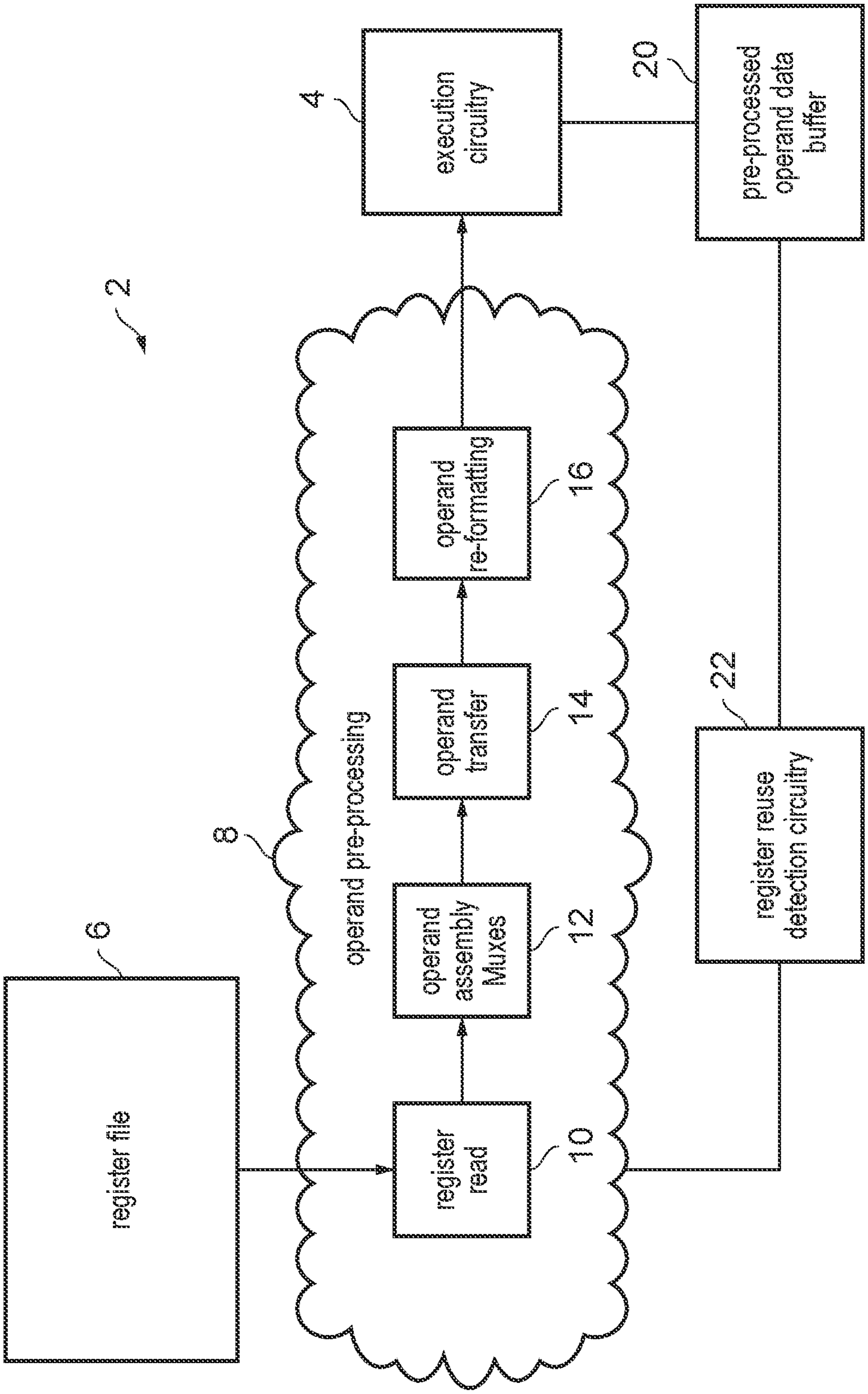
FIG. 1 illustrates an example of an apparatus having register reuse detection circuitry for detecting a register reuse opportunity when pre-processed operand data stored in a pre-processed operand data buffer can be used for processing a subsequent instruction which references the same source register as an earlier instruction.

Traditionally in the field of processor design, the register file has typically been regarded as the fastest-to-access type of storage available to execution circuitry, being located extremely close to the execution circuitry on the chip, with no need for buffering of operand data from the register file between the point at which the register file is read and the point at which the execution circuitry performs a corresponding data processing operation. It would normally be assumed that the execution circuitry can execute on operands read directly from the register file.

However, the inventors recognised that, increasingly, there can be data processing systems where the register file may be extremely large and/or may be located a relatively long distance away from the execution circuitry, or where some reformatting or re-encoding of operand data may be performed after the operand data is read from the registers but before the operand data is processed by the execution circuitry. Therefore, a relatively significant amount of power can be incurred in performing various pre-processing actions on stored operand data read from the register file before it is used by the execution circuitry. The inventors also recognise that there could be software workloads were a reasonable fraction of instructions executed reuse exactly the same operand data that is also used in an earlier instruction. For example, matrix processing workloads may process the same inputs in a number of different combinations, so that the likelihood of operand reuse between instructions can be relatively high. In such cases, obtaining the operand data from the register file every time it is needed can waste power in repeatedly performing the same pre-processing action on the same stored data.

These issues can be addressed by providing an apparatus comprising a pre-processed operand data buffer, separate from the register file, which is accessible to the execution circuitry and stores pre-processed operand data corresponding to a subset of the registers of the register file. Register reuse detection circuitry is provided to detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register. In response to detecting the register reuse opportunity, the register reuse detection circuitry controls the execution circuitry to execute the data processing operation for the subsequent instruction using the pre-processed operand data stored in the pre-processed operand data buffer corresponding to the reused source register, and suppresses the pre-processing action from being performed for the subsequent instruction in relation to stored operand data from the reused source register of the register file. With this approach, a relatively significant amount of power can be saved. For example, based on simulation of typical matrix processing workloads across different types of workloads, it is estimated that 5-10% of the dynamic power consumption of a processor can be saved due to the reuse of pre-processed operand data.

One challenge with this approach can be associated with detecting whether it is guaranteed that no intervening instruction between the previous instruction and the subsequent instruction will cause a write to the reused source register. Some implementations may provide circuit logic to identify the source/destination registers referenced by each instruction and track when an intervening instruction writes to a register referenced as source register by an earlier instruction, so that the register reuse opportunity can be prevented from being detected for a later instruction referencing that register as a source register. However, such register comparison logic may be complex to implement and incur a lot of circuit area cost. In practice, it may be relatively difficult to implement the register comparison logic, particularly if there are a number of different execution units executing different subsets of instructions and it is possible that the intervening instruction can be processed at a different execution unit to the instructions referencing the source registers.

Hence, the inventors have recognised that a simpler approach to detecting whether it can be guaranteed that there will be no intervening overwriting instruction can be based on analysis of the number of cycles separation between the previous and subsequent instructions which both reference the reused source register. In particular, when identifying a potential reuse opportunity when the subsequent instruction is identified as referencing the same reused source register as the previous instruction and the pre-processed operand data for that reused source register is stored in the pre-processed operand data buffer, the register reuse detection circuitry may determine whether a number of cycles between the previous instruction referencing the reused source register and the subsequent instruction referencing the reused source register is less than a threshold number of cycles. In response to determining that the number of cycles between the previous instruction and the subsequent instruction is less than the threshold number, the register reuse detection circuitry may determine that the register reuse opportunity exists for the subsequent instruction as it is guaranteed that no intervening instruction between the previous instruction and the subsequent instruction will cause a write to the reused source register.

In particular, the threshold number of cycles may correspond to a minimum number of cycles possible between two instructions which reference a same source register when those two instructions are separated by an intervening instruction which causes a write to that same source register. Hence, if the previous instruction and the subsequent instruction that both access the reused source register are separated by less than the minimum number of cycles, it can be deduced that there cannot be any intervening instruction writing to that same source register and so the stored operand data for the reused source register is unchanged in the register file between the previous and subsequent instructions, and so it is safe to use the pre-processed operand data corresponding to the reused source register obtained from the pre-processed operand data buffer.

Hence, by using the threshold comparison of the number of cycles separation between the previous instruction and the subsequent instruction as a means of detecting whether it can be guaranteed that there is no intervening instruction, the circuit area and power cost of implementing the register reuse detection circuitry can be greatly reduced in comparison to other more direct techniques of comparing registers read/written by different instructions.

However, in some implementations, the processing pipeline micro-architecture for supplying instructions to the execution circuitry may be such that the minimum number of cycles separation between two instructions referencing the same register when separated by an intervening write to that register may be a relatively small number of cycles, giving too small a window within which the register reuse opportunity can be available. To address this, a delay can be imposed on performing a register-overwriting-enabling action required to have been performed to enable a later instruction to cause overwriting of a given register read by an earlier instruction.

Hence, the apparatus may comprise register-overwriting-enabling circuitry to perform a register-overwriting-enabling action required to have been performed after a read of a given register by an earlier instruction before it is possible that a later instruction could cause overwriting of the given register, where the register-overwriting-enabling action is dependent on at least one condition being satisfied. Register-protection-delaying circuitry may apply a register-protection delay period after the at least one condition is determined to be satisfied, to prevent the register-overwriting-enabling circuitry from performing the register-overwriting-enabling action for at least the register-protection delay period after the at least one condition has been determined to have been satisfied.

This approach of intentionally delaying the register-overwriting-enabling action can be seen as extremely counter-intuitive because it is intentionally delaying an action required for an instruction to make progress, beyond the time when the conditions required for progress are already satisfied. One would normally assume that any required action for a given instruction should proceed as soon as practical once any conditions required to be satisfied for that action to be performed have been satisfied.

However, the inventors recognised that by preventing the register-overwriting-enabling circuitry from performing the register-overwriting-enabling action for at least a register-protection delay period after the at least one condition has been determined to have been satisfied, this will increase the minimum delay between two instructions which reuse a given register as source register when separated by an intervening write to the same register, so that the threshold can be increased for the comparison of the number of cycles separation used to detect the register reuse opportunity. This means it is more likely that two instructions which reuse the same source register can be detected as being separated by less than the minimum number of cycles, allowing the register reuse opportunity to be exploited more often by reusing the pre-processed operand data to save power.

The register-overwriting-enabling action could take various forms. In some examples, the register-overwriting-enabling circuitry comprises register rename circuitry to perform register renaming to map architectural register identifiers specified by instructions to physical register identifiers identifying the registers of the register file, and the register-overwriting-enabling action comprises the register rename circuitry re-mapping a given physical register identifier identifying the given register to a destination architectural register of a newly-renamed instruction after register reclaim circuitry has indicated that the given physical register identifier is free to be re-mapped to a new architectural register identifier. The at least one condition may comprise the register reclaim circuitry indicating that the freed physical register identifier is free to be re-mapped. Hence, with this approach, the earliest possible cycle when a later instruction could overwrite the physical register previously read by an earlier instruction can be delayed, by delaying the ability to remap a previously allocated physical register identifier to a destination architectural register of a newly renamed instruction. In other words, a further delay to register reclaim is applied beyond the cycle in which the register reclaim circuitry otherwise indicates that the given physical register would be free for being re-mapped. This increases the window in time within which two references to the same physical register identifier as a source operand can be trusted as actually referencing the same operand data (rather than potentially being different operand data due to an intervening write which updated the corresponding physical register). With this approach, a relatively long window of time within which reuse opportunities can arise can be provided, so that the threshold for the number of cycles between the previous and subsequent instructions can be relatively high, giving more opportunity for saving power by reusing pre-processed operand data.

In other examples, the register-overwriting-enabling action comprises issue of the later instruction that overwrites the given register read by the earlier instruction; and the at least one criterion comprises the issue circuitry determining that, other than the register-protection-delay period not yet having elapsed, the later instruction is ready to be issued. While this approach could be applied to an out-of-order processor implementation, it can be particularly useful in an in-order implementation where register renaming is not supported and so the approach described above of delaying register reclaim would not be available. By delaying the earliest cycle in which a subsequent overwriting instruction could be issued which overwrites a given register read by an earlier instruction, again the threshold for the number of cycles between the previous and subsequent instructions can be higher, giving more opportunity for saving power by reusing pre-processed operand data. Although it is particularly instructions which write to a destination register previously used as source register by an earlier instruction that would be delayed in their issue timing, in practice this may be the majority of instructions processed, as after an initial period writing to each register for the first time since a reset, subsequently it is likely most instructions will write to a register previously used as a source operand. Hence, in some implementations the delay applied to issue of instructions could be applied to all instructions (which will include the instructions which overwrite a given register read by an earlier instruction), without checking whether each instruction is actually overwriting a register read by an earlier instruction.

Although this approach of delaying the register-overwriting-enabling action can be helpful for power saving by increasing opportunities for pre-processed operand data reuse, not all workloads may have a large number of instructions which actually reuse the same source operand as an earlier instruction. While for some workloads, the delay to the register-overwriting-enabling action may work well and give increased power savings justifying any small performance penalty associated with delaying some instructions due to delaying the register-overwriting-enabling action, for other workloads delaying register reclaim or issue of instructions may reduce performance, without a corresponding benefit in power saving if there is little operand reuse between instructions anyway.

Therefore, while some implementations may implement the register-protection delay period as a fixed number of cycles, it can be beneficial to provide circuitry which dynamically adjusts the duration of the register-protection delay period. Hence, the register-protection-delaying circuitry may dynamically adjust a duration of the register-protection delay period based on at least one feedback indication. By considering feedback gathered during the processing of instructions, the actual needs of the workload being executed can be analysed, and a delay duration can be chosen which is more suited to the particular workload (e.g. a shorter delay can be selected if there are relatively few register reuse opportunities or if it is found that a longer delay adversely affects performance, and a longer delay can be selected if there are more reuse opportunities and performance has been found not to be significantly adversely affected by that longer delay).

For example, in response to a detecting a risk of a stall in forward progress due to not being able to perform the register-overwriting-enabling action for any instruction, the register-overwriting-enabling circuitry may provide a feedback indication to request that the register-protection-delaying circuitry decreases the duration of the register-protection delay period. Hence, this provides a protection measure against performance being adversely affected by the implemented register-protection delay period, since if it is found that a risk of stalls in forward progress is likely, the duration of the register-protection delay period can be reduced to reduce risk of stalls in future. For example, in the example based on register renaming, the feedback indication provided by the register-overwriting-enabling action could be a metric based on the number of free registers available for remapping in a given cycle. For example, the register renaming circuitry could issue a feedback indication if the number of free registers available for remapping is less than a threshold (or could implement several thresholds, triggering successfully stronger feedback hints that the register-protection-delaying circuitry should reduce the duration of the register-protection delay period). Similarly, in the approach where the delay is imposed on issue of an instruction, the feedback could be based on detection of whether the number of instructions available for issue is less than a threshold number (again, in some examples multiple thresholds could be defined, so that when the number of issuable instructions drops below a higher threshold this triggers a weaker form of feedback for an early warning, which could optionally be ignored by the register-protection-delaying circuitry, while if the number of issuable instructions available in a given cycle drops below a lower threshold, this may trigger a stronger feedback indication which may require the register-protection-delaying circuitry to decrease the duration of the register-protection delay period). It will be appreciated that there can be a wide variety of ways of implementing the feedback mechanism.

Another type of feedback for adjusting the duration of the register-protection delay period can be based on instruction separation tracking circuitry which tracks, for at least one tracked register of the plurality of registers, a separation between successive instructions reading that tracked register. The register-protection-delaying circuitry may adjust the duration of the register-protection delay period in response to a separation-tracking feedback indication depending on the separation tracked by the instruction separation tracking circuitry. By considering the maximum separation seen between successive instructions reading the same tracked register, this can help detect the extent to which operand data is reused between instructions, to help set the duration of the register-protection delay period at an appropriate duration given the current workload being executed. The separation-tracking feedback indication may be dependent on a comparison between a threshold set based on a current duration of the register-protection delay period and a maximum separation tracked by the instruction separation tracking circuitry for any of the at least one tracked register. For example, if the threshold is less than the maximum separation, the duration of the register-protection delay period could be increased (as some instances of reuse opportunities have been seen which were not able to be exploited because the register-protection delay period was currently too short), while if the threshold set based on the current duration is greater than the maximum separation then the duration of the register-protection delay period could be decreased (to reduce risk that the current relatively long delay period may be adversely affecting performance when there is little benefit to implementing such a long delay because no pairs of instructions separated by that long delay have been observed as accessing the same register). With this approach, a better balance between power saving and performance can be achieved.

It may be sufficient track the separation between successive reading instructions only for a subset of the registers, to limit the power and circuit area overhead of the instruction separation tracking circuitry. For example, the tracked register(s) may be the same subset of registers for which the pre-processed operand data buffer stores the pre-processed operand data. It can be useful for the tracked registers to match the protected registers for which pre-processed operand data is stored in the buffer, as this allows the same sets of counters to be shared both for tracking separation for the purpose of adjusting the register-protection delay period and for tracking the separation between successive accesses to the same register for the purpose of detecting whether the register reuse opportunity exists.

Selection circuitry may be provided to select, as the subset of the plurality of registers for which the pre-processed operand data buffer stores the pre-processed operand data, one or more registers which are referenced as source registers by instructions of at least one predetermined class of instructions. For example, the predetermined class of instructions could include certain vector instructions and/or matrix processing instructions which operate on one-dimensional or two-dimensional arrays of data. The inventors have recognised that there are certain classes of instructions (e.g. outer product instructions, instructions which process multiple long vectors, multiple-vector indexed dot product instructions, etc.) that are more likely to involve a lot of reuse of operands between instructions, so that by selecting the registers whose data is to be buffered in the pre-processed operand data buffer based on which registers are referenced by the at least one predetermined class of instructions, it can be more likely that significant power savings are available by reusing pre-processed operand data.

The pre-processing action may comprise a wide variety of actions taken between reading the stored operand data from the register file and processing the operand data by the execution circuitry. Any one or more of these actions may be suppressed when pre-processed operand data is re-used from the pre-processed operand data buffer for the input to the data processing operation performed by the execution circuitry.

For example, the pre-processing action suppressed in response to detecting the register reuse opportunity may comprise reading of the stored operand data from the given source register of the register file. The reading of the register file may incur a given power cost, so if the register read can be suppressed because pre-processed operand data is available closer to the execution circuitry in the pre-processed operand data buffer, power can be saved.

Similarly, in some examples the stored operand data read from the register file may be multiplexed to form operand data for processing (e.g. because the register file supports multiple different access patterns by which the register storage can be addressed in order to define an operand for an instruction). That multiplexing can also incur a certain amount of power, so it can be useful to suppress this multiplexing if it is not needed because pre-processed operand data (which has already undergone the multiplexing when processing an earlier instruction) can be reused for a later instruction.

However, in some examples the register reuse detection circuitry may be implemented at a point of the pipeline beyond which the register read from the register file (and multiplexing of the operand if necessary) has already taken place. Nevertheless, there can still be a number of downstream pre-processing actions that can be suppressed to save power.

For example, even after being read from the register file, the physical transfer of the stored operand data to the execution circuitry may incur a power cost. The execution circuitry could be a long distance away from the register file (particularly in examples which implement matrix array registers which may comprise a relatively large amount of storage and so require a physically large area on the chip, increasing the distance between register file and execution logic). Therefore, the operand data may need to pass through a number of flip-flops or repeaters when transferred to the execution circuitry, which will consume dynamic power. If this physical transfer can be suppressed for a later instruction because the pre-processed operand data which has already been transferred previously is available from a buffer local to the execution circuitry, power can be saved. Hence, in some examples the pre-processing action suppressed in response to detecting the register reuse opportunity comprises transfer of the stored operand data from the given source register to the execution circuitry.

Another example can be where the pre-processing action suppressed in response to detecting the register reuse opportunity comprises re-formatting the stored operand data to generate the pre-processed operand data. There can be examples where, once the operand data has been transferred to the execution circuitry, the execution circuitry may initially perform some re-formatting (e.g. re-encoding) of the operand data, which incurs a power cost. For example, for operations involving multiplication (which are very common in vector and matrix processing workloads, for instance), the re-formatting may comprise Booth encoding operand data for a multiplication operation. Booth encoding is a technique in which multiply operands are re-encoded based on detection of runs of successive is in the operand data, which is helpful for reducing the number of partial products that need to be added to obtain a multiplication result. The Booth encoding (or other similar operand re-formatting applied at the execution circuitry as a preliminary step to performing an arithmetic operation) can be relatively expensive in terms of power. Therefore, if pre-processed operand data which has already undergone the Booth encoding or other re-formatting can be reused from the pre-processed operand data buffer, power can be saved.

Some examples may provide an apparatus comprising register rename circuitry to perform register renaming to map architectural register identifiers specified by instructions to physical register identifiers indicative of corresponding portions of hardware register storage; register reclaim circuitry to determine when a previously allocated physical register identifier is free to be re-allocated to a new architectural register identifier specified by an instruction awaiting renaming; reclaim delaying circuitry, responsive to the register reclaim circuitry indicating that a given physical register identifier is free to be re-allocated, to prevent the given physical register identifier actually being re-allocated during a protection delay period following the register reclaim circuitry indicating that the given physical register identifier is free to be re-allocated; and protection delay period adjustment circuitry to dynamically adjust a duration of the protection delay period based on at least one feedback indication.

This approach is extremely counter-intuitive, since one would assume that intentionally delaying the timing when a freed physical register identifier can be re-allocated to a new architectural register identifier would harm processing performance. Normally, processor designs focus on being able to reclaim registers as soon as it is safe to do so. However, as noted above, the inventors recognised that sometimes delaying the timing at which a given physical register identifier can be re-allocated to a new architectural register specifier can help to save power by increasing the window of opportunity for reuse of pre-processed operand data. By providing dynamic adjustment of the protection delay period, the balance between power savings and performance can be adjusted depending on the needs of the executed software workload, to enable power savings when possible but mitigate the impact on performance.

Specific examples will now be described with reference to the drawings.

FIG. 1 illustrates an example of an apparatus 2 comprising execution circuitry 4 for executing data processing operations in response to instructions. A register file 6 is provided comprising a number of registers for storing operand data for the instructions executed by the execution circuitry 4. Operand data stored in the register file 6 may undergo a number of pre-processing actions performed by operand pre-processing circuitry 8 between the register file 6 and the execution circuitry 4. For example, as shown in FIG. 1, the pre-processing actions may include:

- register read circuitry 10 reading the stored operand data from the register file 6;
- operand assembly multiplexing circuitry 12 multiplexing the operand data read from portions of the register file to form an operand value to be processed by the execution circuitry 4;
- physical transfer of the multiplexed operand data to the execution circuitry using operand transfer circuitry 14 (e.g. signal paths including repeater elements and flip-flops to ensure the operand data can travel a relatively large distance across the chip over multiple processing cycles); and operand re-formatting circuitry 16 re-formatting the operand data (such as Booth encoding the operand data ready for the execution circuitry to perform a multiply operation using the Booth encoded operand data).

Figure 2:
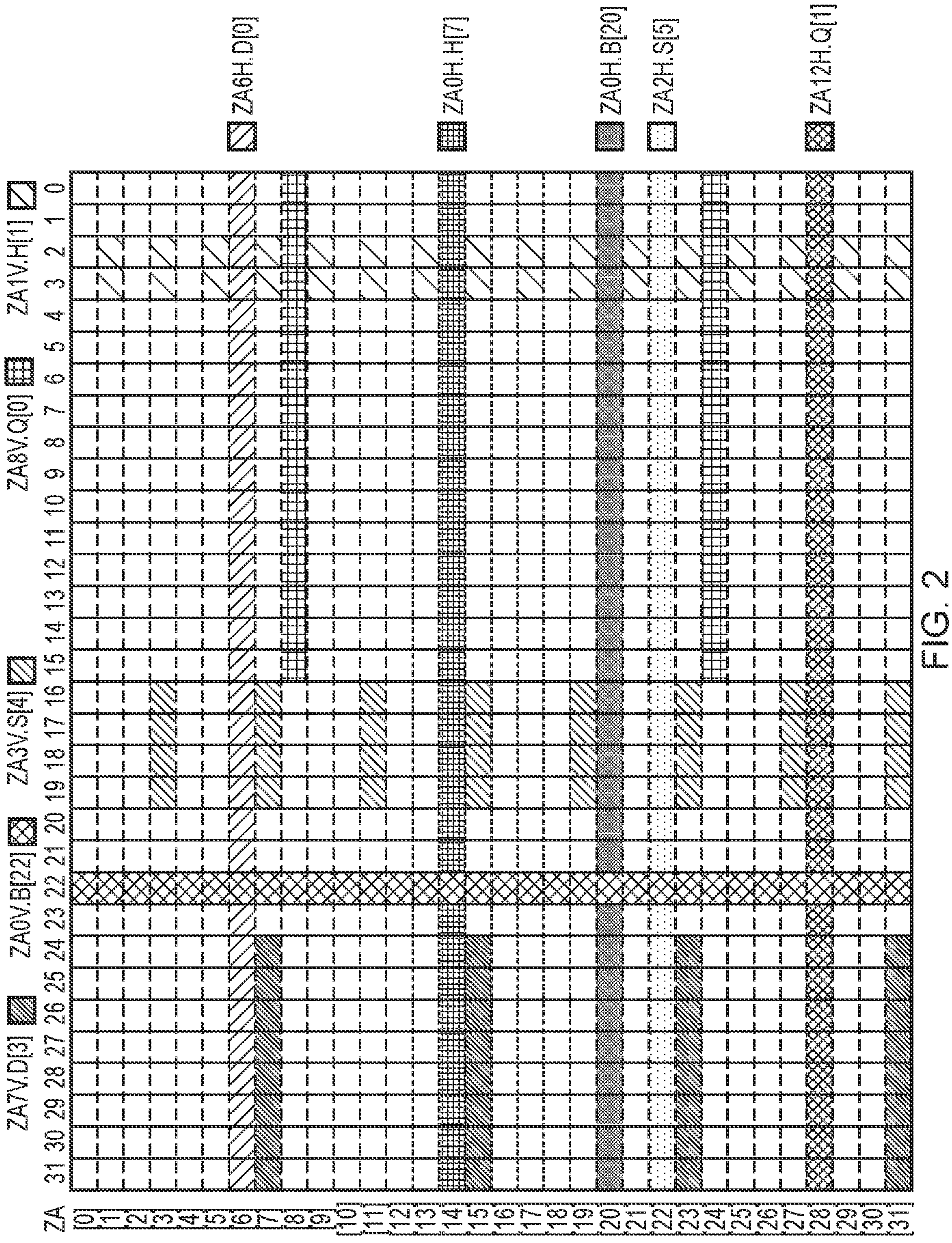
FIG. 2 illustrates an example of different ways of addressing array register storage within a register file.

These pre-processing actions consume a relatively significant amount of power, particularly where the register file 6 includes array registers as shown in FIG. 2 which can be used to represent a two-dimensional data structure such as a portion of a matrix. Each small box within FIG. 2 represents one vector element of a given size (e.g. 8, 16, 32 or 64 bits). In the example of FIG. 2, 32 array registers ZA[0] to ZA[31] are provided, which are addressable in a wide variety of ways as shown:

in the examples ZA6H.D[0], ZA0H.H[7], ZA2H.S[5], ZA12H.Q[1] a horizontal slice of data from a single array register ZA[i] is accessible as a vector operand, with different sized vector element sizes denoted by the .D, .H, .S, .Q notation;

in the example ZA0V.B[22], a vertical slice of data from a given column position [22] within each of the 32 ZA registers ZA[0] to ZA[31] is accessible as a vector operand. Again, it would be possible to provide different data element sizes for the vector operand accessed as a vertical slice, similar to the horizontal slices shown for FIG. 2.

As shown in examples ZA7V.D[3], ZA3V.S[4], ZA1V.H[1], ZA8V.Q[0], it is also possible to access, as a single vector operand, a tile of elements where each portion of the tile is extracted from a different one of the ZA registers ZA[0] to ZA[31]. For example, ZA7V.D[3] comprises 4 sets of 8 elements selected from column positions [31:24] of each of ZA[7], ZA[15], ZA[23], ZA[31]; ZA3V.S[4] comprises 8 sets of 4 elements selected from column positions [19:16] of each of ZA[3], ZA[7], ZA[11], ZA[15], ZA[19], ZA[23], ZA[27] and ZA[31]; ZA1V.H[1] comprises 16 sets of 2 elements selected from column positions [3:2] of each of the odd-numbered ZA registers, and ZA8V.Q[0] comprises two sets of 16 elements selected from column positions [15:0] of ZA[8] and ZA[24] respectively.

It will be appreciated that this is just a subset of the addressing patterns that could be available. Given the relatively large size of the array (and hence relatively long distance by which portions of the array can be located relative to the execution circuitry 4) and the wide variety of addressing patterns available (requiring relatively complex multiplexing by the operand assembly multiplexing circuitry 12), the pre-processing circuitry 8 may consume a relatively significant amount of power in reading, multiplexing and transferring the operand data. Also, the nature of operations applied to such matrix array data is such that it can include a lot of multiplications, so that the Booth encoding overhead of re-formatting operand data can also incur a lot of power consumption.

Referring again to FIG. 1, to reduce the power consumption of the apparatus 2, a pre-processed operand data buffer 20 is provided local to the execution circuitry 4, to store pre-processed operand data for a subset of the registers of the register file 6. Register reuse detection circuitry 22 is provided to detect when a register use opportunity exists, namely when a subsequent instruction references a reused source register which is the same as a source register referenced by a previously executed instruction, when it is determined that the pre-processed operand data for that reuse source register is stored in the pre-processed operand data buffer 20 and it can be guaranteed that there is no intervening instruction which writes to that source register between the previous instruction and the subsequent instruction (if there was such an intervening write, the pre-processed operand data could no longer be used as the underlying data in the register file may have changed). This exploits the fact that for matrix processing algorithms, there can be a lot of such operand reuse in instruction patterns such as:

FMOPA ZA0.S, P0/M, P2/M, Z0.S, Z2.S
FMOPA ZA1.S, P0/M, P3/M, Z0.S, Z3.S
FMOPA ZA2.S, P1/M, P2/M, Z1.S, Z2.S
FMOPA ZA3.S, P1/M, P3/M, Z1.S, Z3.S.

Here, the operands Z0, Z1, Z2 and Z3 are all vector operands that are used for more than one instruction (P0-P3 referring to the associated predicate operands used to indicate which elements of the vector operands are active or inactive, with the /M suffixes indicating that merging predication is used, where the portions of results corresponding to inactive vector elements retain the previous value of the corresponding portion of the ZA destination register). In this instance, the FMOPA instruction is an instruction to perform, using floating-point arithmetic, a sum of outer products and accumulate operation on two one-dimensional vector operands to generate respective elements of a two-dimensional structure written back to the tile array ZA. It will be appreciated that this is not the only type of instruction which could reuse operands in this way.

Therefore, when the register reuse detection circuitry 22 detects a register reuse opportunity, the register reuse detection circuitry 22 controls the execution circuitry to reuse the pre-processed operand data already stored in the buffer 20 for the reused source register, for executing the data processing operation for the subsequent instruction, and controls the operand pre-processing circuitry 8 to suppress at least one of the pre-processing actions 10, 12, 14, 16 from being performed in relation to the stored operand data for the reused source register which is stored in the register file 6. It will be appreciated that not all of the pre-processing actions 10, 12, 14, 16 may be suppressed. The register reuse detection circuitry 22 could be implemented at a variety of different points within a processing pipeline, and so depending on the point where the register reuse detection circuitry 22 is executed, it may be too late to suppress all of the pre-processing actions, but nevertheless by suppressing at least one pre-processing action power can be saved when the register reuse opportunity is detected.

Figure 3:
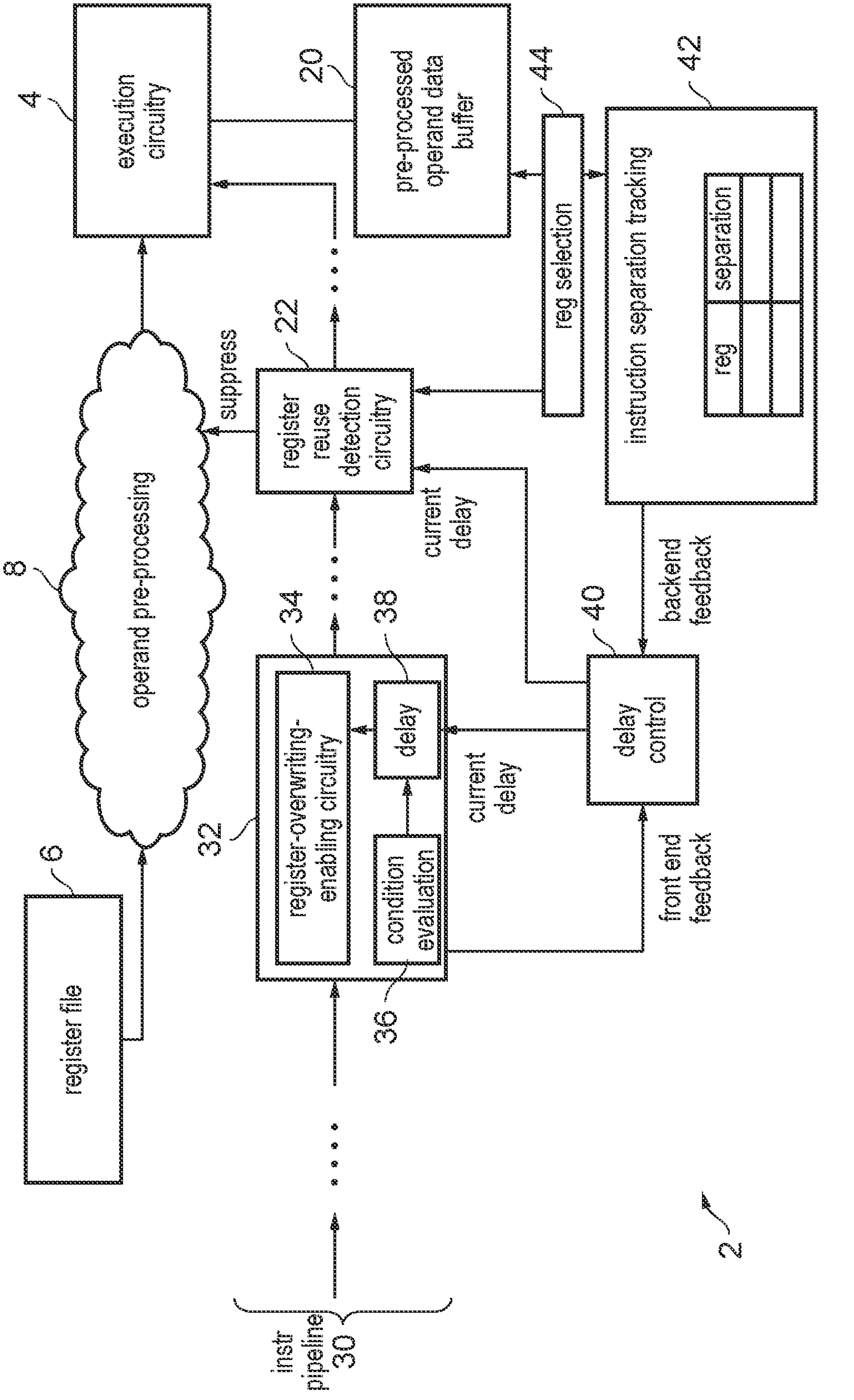
FIG. 3 illustrates an example of detecting the register reuse opportunity based on a number of cycles separating two instructions which reference the same source register.

FIG. 3 shows in more detail an example of the apparatus 2, which as in FIG. 1 comprises the register file 6, operand pre-processing circuitry 8, execution circuitry 4 and pre-processed operand data buffer 20. FIG. 3 shows more detail for circuitry used by the register reuse detection circuitry 22 to detect whether the register reuse opportunity exists. A difficulty in detecting whether it is safe to reuse pre-processed operand data from an earlier instruction referencing the same source register can be in detecting whether there is any risk that an intervening instruction could have overwritten the data in that source register between the subsequent instruction that could potentially reuse the pre-processed operand data and the earlier instruction that caused the pre-processed operand data to be written to the buffer 20. Actually comparing source registers of the reused instructions against destination registers of other potentially overwriting instructions could be complex to implement. Therefore, instead the approach shown in FIG. 3 exploits an approach based on detecting the number of cycles separation between pairs of instructions that reference the same register.

As shown in FIG. 3, the instruction pipeline 30 used to supply instructions to the execution circuitry 4 includes the register reuse detection circuitry 22 at a given stage of the pipeline (e.g. at a register rename stage, at an instruction issue stage, at a backpressure stage for applying backpressure to instructions issued for execution to request a reduced rate of supply of instructions from earlier stages if the execution circuitry 4 is getting swamped, etc.).

Also, the pipeline includes a pipeline stage 32 which includes register-overwriting-enabling circuitry 34 which performs at least one register-overwriting-enabling action required to have been performed before it is possible for a subsequent instruction to overwrite a register read as a source register by an earlier instruction. For example, as discussed in subsequent examples with respect to FIGS. 6 and 7, the register-overwriting-enabling action could be the issue of an instruction which specifies as its destination register the same register used as a source register by an earlier instruction, or could be the re-mapping of a previously allocated physical register for allocation to a new destination architectural register in an implementation supporting register renaming. While FIG. 3 shows the stage 32 comprising the register-overwriting-enabling circuitry 34 as a separate pipeline stage from the pipeline stage comprising the register reuse detection circuitry 22, in other examples the register reuse detection circuitry 22 could be at the same stage of the pipeline as the register-overwriting-enabling circuitry 34. The pipeline stage 32 also comprises condition evaluation circuitry 36 to evaluate whether at least one condition, required as a pre-requisite to performing the register-overwriting-enabling action, is satisfied, and delay circuitry 38 for applying a register-protection delay after the cycle in which the at least one condition is satisfied, to delay the register-overwriting-enabling circuitry 34 from performing the register-overwriting-enabling action for at least the duration of the register-protection delay period after the cycle in which the at least one condition is first determined to be satisfied.

Figure 4:
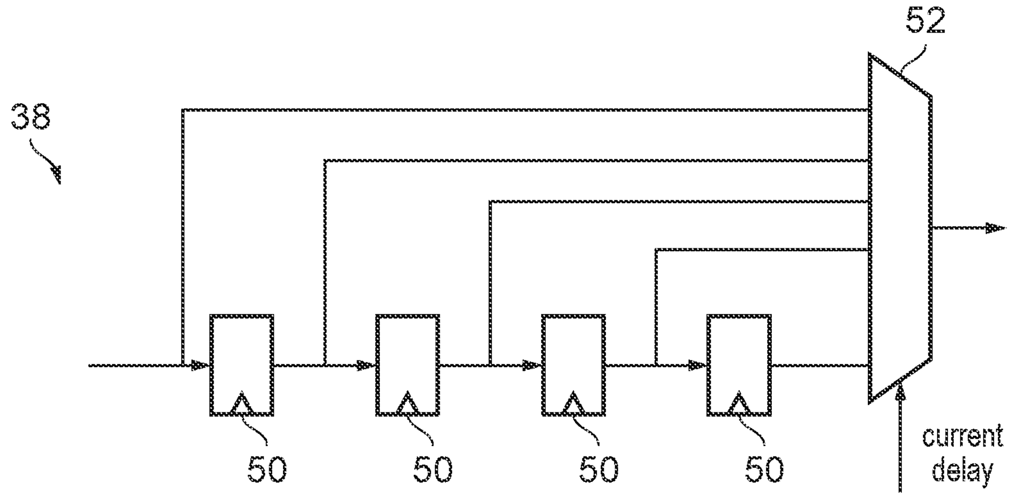
FIG. 4 illustrates an example of register-protection-delaying circuitry to apply a variable delay to a register-overwriting-enabling action.

Delay control circuitry 40 is provided to dynamically adjust the duration of the register-protection delay imposed by the delay circuitry 38, based on various feedback indications provided by parts of the pipeline 30, as described in more detail below. The delay control circuitry 40 transmits an indication of the current delay selected for the register-protection delay period to both the delay circuitry 38 and to the register reuse detection circuitry 22. FIG. 4 shows an example of the delay circuitry 38, which comprises a number of delaying elements 50 (e.g. flip-flops) each to apply a cycle's delay to the signal output by condition evaluation circuitry 36 which indicates that the at least one condition is satisfied. A multiplexer 52 selects between delayed signal paths sampled after varying numbers of delay elements 50. The control input for the multiplexer 52 is a "current delay" control signal output by the delay control circuitry 40. Hence, a variable number of cycles can be selected as the duration of the register protection delay period, based on the dynamic control by delay control circuitry 40.

Returning to discussion of FIG. 3, register selection circuitry 44 is provided to select a subset of registers which are to be designated as protected registers for which pre-processed operand data is stored in the pre-processed operand data buffer 20. For example, the selected registers can be a maximum of N registers that have been specified as a source register by instructions of one or more classes of instructions (e.g. one of these classes could be the FMOPA instruction described above). The classes may be selected by the system designer to be types of instructions that are expected to be relatively likely to reuse operand data in access patterns similar to that of the FMOPA instruction sequence shown earlier. N may be any number greater than or equal to 1, but in practice need not be particularly high (e.g. it may be sufficient to have N=2 or 3 so that a maximum of 2 or 3 registers have their operand data stored in the buffer 20). Instruction separation tracking circuitry 42 is provided to track, for each of the selected subset of registers selected for protection in the operand data buffer 20, a separation metric indicative of a number of processing cycles separation seen between one instance of an instruction which references the corresponding register as source operand and another instance of an instruction which references that register as its source operand. The register selection circuitry 44 may use the separation metrics to assess whether it is worth continuing to protect a given register or whether it may be preferable to switch to protecting a different register (e.g. if in practice the separation delay between successive references to the previously selected register is too long to give sufficient opportunities for register reuse—the longer the separation the more likely an intervening write will overwrite the register between the successive register reads to the register). When seeking to allocate a new register as one of the protected registers, the register selection circuitry 44 may implement replacement policy such as least recently used to decide which of the previously protected registers should be replaced.

The register reuse detection circuitry 22 detects a register reuse opportunity when a subsequent instruction is detected as referencing a same source register as a previous instruction, that reused source register is one of the protected registers currently selected by the register selection circuitry 44 and pre-processed operand data has already been stored for that register in the buffer 20, and the number of cycles separation between the previous instruction and the subsequent instruction is less than a minimum threshold number of cycles selected based on the current delay selected by the delay control circuitry for the register protection delay period applied by delay circuitry 38 in delaying the register-overwriting-enabling action. The number of cycles separation between the previous instruction and the subsequent instruction may be determined by the register reuse detection circuitry 22 based on the separation count values tracked by the instruction separation tracking circuitry 42 (hence the same counters for counting the number of cycles since a previous access to each protected register can be shared both for the purpose of determination by register reuse detection circuitry 22 of whether the register reuse opportunity exists, and for generating the backend feedback indications which are provided to delay control circuitry 40 for setting the duration of the register protection delay period applied by delaying circuitry 38).

Figure 5:
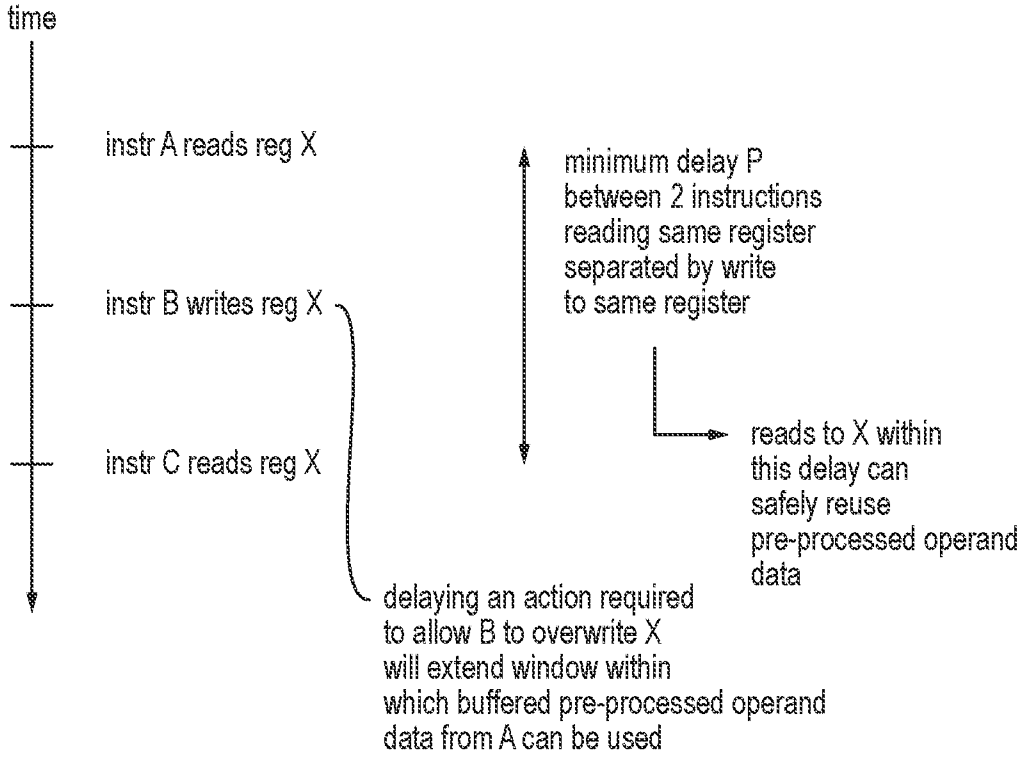
FIG. 5 illustrates an example sequence of instructions.

As shown in FIG. 5, this approach is based on assessment of the minimum number of cycles between two successive reads A and C to a same register X when separated by an intervening write B to the same register X. For a given pipeline design, in the absence of any additional delay period imposed by delaying circuitry 38, that minimum number of cycles may be a certain number of cycles P, and P will depend on the particular pipeline implementation.

For example, in one example shown in Timing example 1 below, the pipelining of the instructions A, B, C shown in FIG. 5 can such that instruction A takes 3 cycles to execute and any potential overwriting instruction B which overwrites the register written by A cannot start until instruction A is in its third cycle, but instruction C can start one cycle after A or B. In this example, the minimum number of cycles between A and C with an intervening write between A and C may be 3 cycles, and "pipe stage 3" is the last stage at which it is possible for an instruction to be cancelled.

Timing Example 1

| Cycle | pipe stage 1 | pipe stage 2 | pipe stage 3 |
|---|---|---|---|
| 0 | A | | |
| 1 | | A | |
| 2 | B | | A |
| 3 | C | B | |
| 4 | | C | B |
| 5 | | | C |

Hence, if actually the instructions A and C are detected with only 2 cycles between them, as in timing example 2, then it can be deduced that there cannot possibly be an intervening write B between instructions A and C which reference the same register, as the delay between A and C is less than the minimum possible delay possible in a scenario where there was an intervening write to the reused register.

Timing Example 2

| Cycle | pipe stage 1 | pipe stage 2 | pipe stage 3 |
|---|---|---|---|
| 0 | A | | |
| 1 | | A | |
| 2 | C | | A |
| 3 | | C | |
| 4 | | | C |

Hence, by comparing the number of cycles separation between earlier/later instructions referencing the same source register with a threshold, this provides a technique by which, without actually comparing register identifiers of destination registers of instructions against source registers of other instructions, it can be detected that it is guaranteed that there can be no intervening writes to the reused register, to check it is safe to use the pre-processed operand data written to buffer 20 by instruction A when processing instruction C.

However, in practice, for many pipeline implementations the minimum delay P between such instructions A and C with an intervening register write B between them may be too small to allow for much opportunity for reusing the pre-processed operand data. For example, in some cases P may be as little as 1 and even back-to-back instructions might not necessarily guarantee that there can be no intervening write.

Therefore, by applying the delay to the register-overwriting-enabling action using delay circuitry 38 as described earlier, the timing at which the overwriting instruction B can be executed relative to A can be delayed, increasing the minimum delay period between A and C for which it can be safe to assume no intervening writes are possible.

For example, as shown in timing example 3, if an additional 2-cycle delay is applied to instruction B (after the earliest cycle when it could otherwise execute), by delaying the register-overwriting-enabling action required for B to execute and write to the same register as A, then the minimum number of cycles possible between A and C in presence of an intervening write becomes 5 cycles:

Timing Example 3

| Cycle | pipe stage 1 | pipe stage 2 | pipe stage 3 |
|---|---|---|---|
| 0 | A | | |
| 1 | | A | |
| 2 | | | A |
| 3 | | | |
| 4 | B | | |
| 5 | C | B | |
| 6 | | C | B |
| 7 | | | C |

This means that there is more opportunity, in cases where there is no intervening write, to detect that two instructions referencing the same register can reuse the pre-processed operand data between them, as in timing example 4:

Timing Example 4

| Cycle | pipe stage 1 | pipe stage 2 | pipe stage 3 |
|---|---|---|---|
| 0 | A | | |
| 1 | | A | |
| 2 | | | A |
| 3 | | | |
| 4 | C | | |
| 5 | | C | |
| 6 | | | C |

Now, as the number of cycles between A and C is 4 cycles, less than the minimum of 5 cycles possible if there was an intervening write B (longer than the normal minimum of 3 cycles if the added register-protection delay of 2 cycles had not been applied to delay instances of processing B), then an opportunity for register reuse is available which would not have been available otherwise.

Hence, in some examples the threshold number of cycles for separation of two instructions referencing the same source register, applied by the register reuse detection circuitry 22 for detecting whether a register reuse opportunity exists, may be P+V, where:

P is a fixed number of cycles corresponding to the minimum delay between instructions A and C in the presence of an intervening write, if the delay circuitry 38 did not introduce any additional delay in the register-overwriting-enabling action required for B to execute after A; and V is a variable number of cycles dependent on the additional delay imposed by delay circuitry 38, as selected by the delay control circuitry 40.

It will be appreciated that the particular numbers of cycles shown in the timing examples above are just for illustration, and in practice the actual delays between instructions could be shorter or longer depending on the particular pipeline implementation. However, it serves to illustrate the principle that it is possible to check for risk of intervening writes based purely on assessment of the separation between two reads to the same source register, and why it can be beneficial to apply a delay to an action required for processing of the intervening writing instruction, which would otherwise be counter-intuitive as delaying that instruction could be seen as harmful to performance.

As shown in FIG. 3, the delay control circuitry 40 receives a number of feedback indications from portions of the pipeline 30, for use in dynamically adjusting the current duration of the delay applied by delay circuitry 38. A front-end feedback indication from the register-overwriting enabling circuitry 34 can indicate if the current delay is causing a risk of a pipeline stall due to their being insufficient number of instructions for which the register-overwriting-enabling circuitry 34 can be performed. The delay control circuitry 40 can reduce the length of the delay period if the front end feedback indication is received (or if a sufficient number of front end feedback indications are received in a given period, depending on the dynamic control mechanism used). Also, a backend feedback indication is received from the instruction separation tracking circuitry 42, to give feedback based on the actual separation seen between successive instructions which read the same one of the protected registers selected by the register selection circuitry 44. Based on a comparison between the maximum separation seen for any of the tracked registers, and a threshold set based on the current delay period set by delay control circuitry 40, the delay control circuitry 40 can adjust the delay period, to be greater when reuse of a source register between instructions with greater maximum separation are encountered by the instruction separation tracking circuitry 42 than when reuse of a source register between instructions with smaller maximum separation is detected. This way, if the maximum separation between instructions which could reuse pre-processed operand data is relatively small, the delay control circuitry 40 can reduce the length of the delay period as even if the delay was longer, instructions would not benefit from greater register reuse opportunities, and so reducing the delay applied by circuitry 38 would help to improve performance by avoiding unnecessary delays to instructions. On the other hand, if the tracking by instruction separation tracking circuitry 42 identifies that there are reuse opportunities which could have been present, but were not exploited because the current delay is too short and so the instructions were separated by greater number of cycles than the current threshold used by the register reuse detection circuitry 22 for detecting register reuse opportunities, then the duration of the delay imposed by circuitry 38 could be increased.

Figure 6:
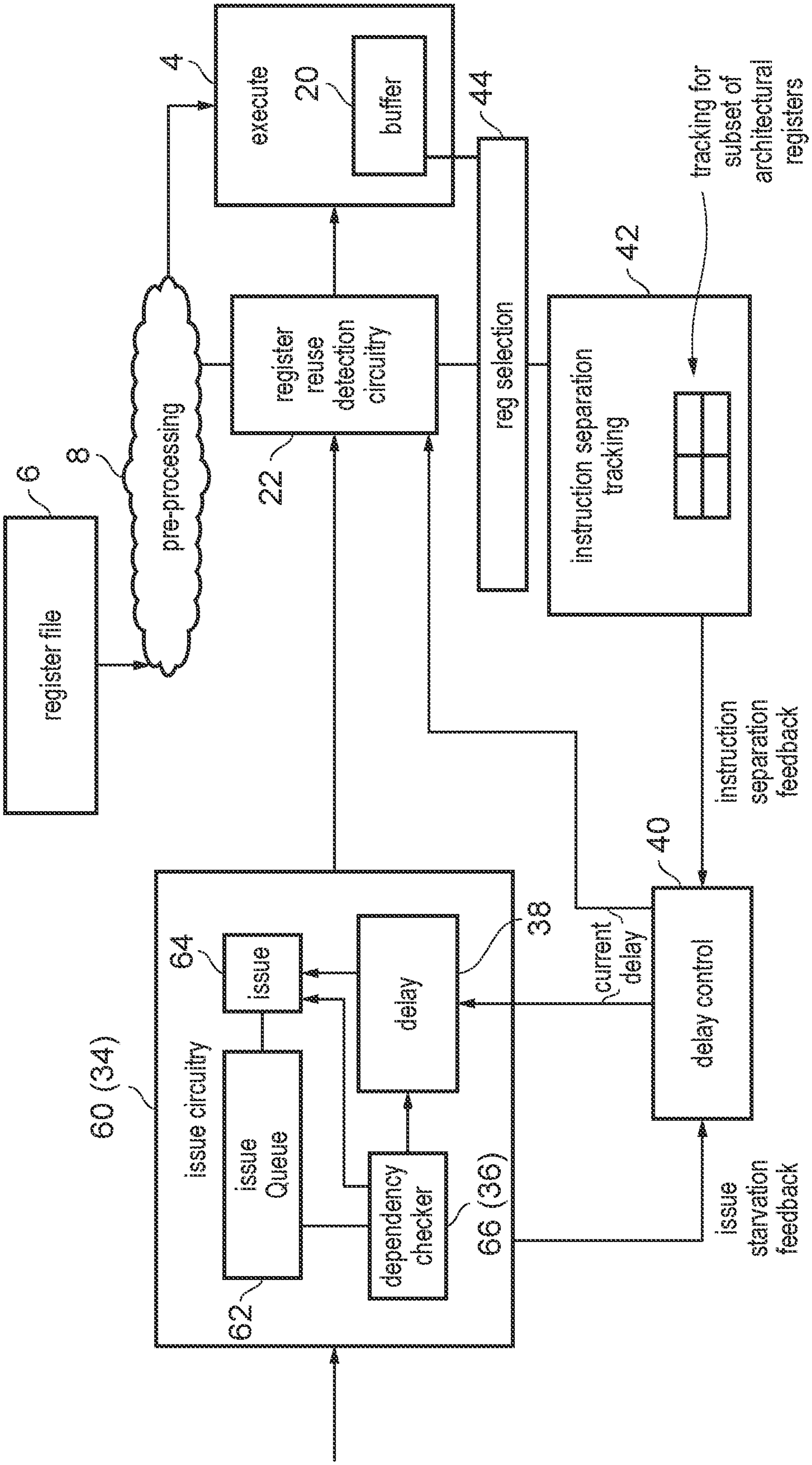
FIG. 6 illustrates an example of applying a variable delay to issue of an instruction which overwrites a given register read by an earlier instruction.
Figure 7:
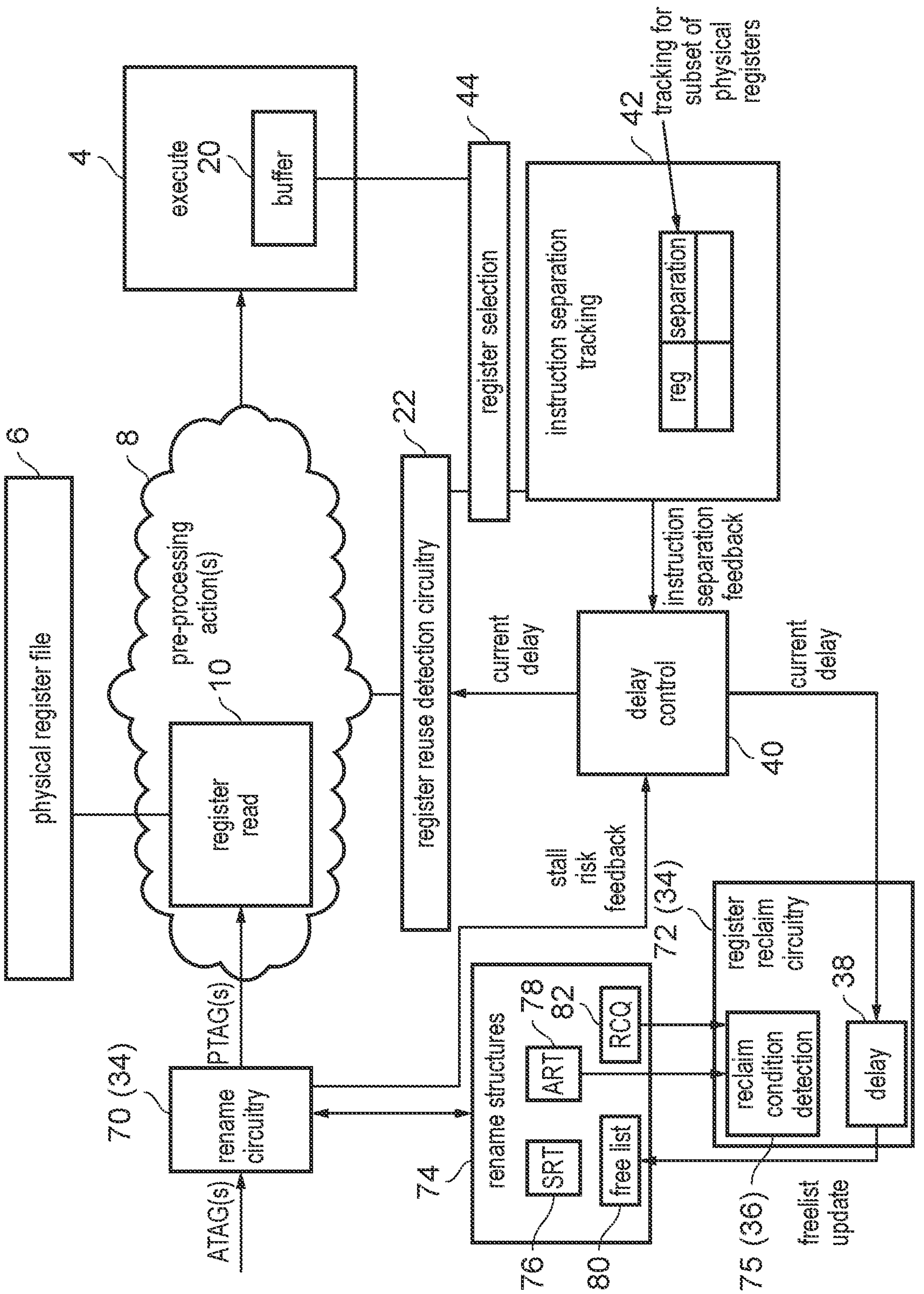
FIG. 7 illustrates an example of applying a variable delay to freeing a given physical register for re-allocation to a destination architectural register of a newly renamed instruction.

FIGS. 6 and 7 show two specific examples for the register-overwriting-enabling circuitry 34.

In FIG. 6 (which comprises all the components already described for FIG. 3), the register-overwriting-enabling circuitry 34 in this particular example comprises issue circuitry 60 for issuing instructions for execution by the execution circuitry 4. The condition evaluation circuitry 36 comprises a dependency checker 66 which checks for register dependency hazards between instructions, to control issue of a given instruction at a timing at which it is predicted that, by the time the instruction reaches the register read stage of the pipeline, the operands for that instruction will be available in the register file 6. The issue circuitry 60 has access to an issue queue 62 which queues instructions awaiting issue, and comprises issue control circuitry 64 which selects, from among the queued instructions in queue 62, an instruction to be issued for which the dependency checker 66 has indicated that the dependency checks have completed so that the dependency checking conditions required for the instruction to be issued have all been satisfied. For instructions which do not write to a destination register which is the same as a source register of an earlier instruction, there is no need to delay issue of a given instruction beyond the cycle in which the dependency checker 66 determines that all dependency checks have passed for a given instruction. However, in practice many instructions may write to a destination register which is the same as an earlier instruction's source register. At least for those instructions which write to a destination register which is the same as an earlier instruction's source register (and in some cases, for all instructions, to avoid the overhead of checking for whether an instruction's destination register is the same as an earlier instruction's source register), the delay circuitry 38 can apply an additional register-protection delay, beyond the cycle in which the dependency checker 66 confirms dependency checks are passed for a given instruction, to delay the earliest cycle at which that given instruction can issue for at least one further cycle after the cycle in which the dependency checker signals that, but for the register-protection-delay period applied by delay circuitry 38, the instruction is ready to issue. If the issue circuitry 60 detects that, due to the delay imposed by delay circuitry 38, there are insufficient instructions ready to issue in a given cycle (but the dependency checker has indicated there is at least one instruction that has passed its dependency check conditions), then the issue circuitry 60 can issue, as an example of the front end feedback indication mentioned in FIG. 3, an issue starvation feedback indication indicating that there is a risk of a pipeline stall due to insufficient number of instructions available for issue in a given cycle. The delay control circuitry 40 can respond to that issue starvation feedback indication by reducing the duration of the delay applied by delay circuitry 38.

Hence, with this approach in FIG. 6, adding a further delay in issuing instructions for execution (beyond the cycle when otherwise they would be ready to issue) can be useful to increase the minimum number of cycles possible between two instructions A and C which reuse source register X when separated by an intervening instruction B writing to the same register X, to increase windows of opportunity for reuse of pre-processed operand data. This approach can be useful for in-order implementations for which register renaming is not available as a mechanism for controlling the delay between instructions A and C.

FIG. 7 shows another example, suitable for an out-of-order processor which supports register renaming. In this example, the register-overwriting-enabling circuitry 34 comprises rename circuitry 70 for performing register renaming to map architectural register identifiers (ATAGs) specified by instructions defined according to an instruction set architecture to physical register identifiers (PTAGs) identifying registers of the physical register file 6, and register reclaim circuitry 72 comprising reclaim condition detection circuitry 75 (an example of the condition evaluation circuitry 36 mentioned earlier) to detect when a register reclaim condition is satisfied for a given physical register identifier already allocated to a particular architectural register identifier so that it can be freed to be reallocated for the destination architectural register identifier specified by a newly renamed instruction. The rename circuitry 70 and the reclaim circuitry 72 use a number of rename data structures 74, including a speculative rename table (SRT) 76, architectural rename table (ART) 78, free register list 80 and register commit queue (RCQ) 82.

The SRT 76 specifies a speculative set of register mappings associated with the latest speculative point of program execution reached by the rename stage 70. When an instruction reaches the rename circuitry 70, any source architectural register specifiers specified by the instruction are mapped to the physical register identifiers identified in the entries of the SRT 76 corresponding to those source architectural register specifiers. Each destination architectural register identifier specified by the instruction is mapped to a free physical register identifier, selected from among those physical register identifiers identified as free for re-allocation by the free list 80. The free list 80 is updated to mark the selected physical register identifier(s) as no longer being free for re-allocation. Also, the entry (or entries, if there are multiple destinations in one instruction) of the SRT 76 corresponding to the destination architectural register identifier(s) is updated to specify the physical register identifier that is now mapped to that architectural register identifier. Also, for each new mapping generated, a RCQ entry indicating the mapping between the destination architectural register identifier and the selected physical architectural register identifier is pushed to the RCQ 82, which acts as a first-in-first-out buffer representing a sequential record of the changes made to the SRT 76 in response to successive instructions. A pointer associated with the RCQ 82 tracks the point of the queue corresponding to the commit point of program flow (the point of program flow corresponding to the oldest uncommitted instruction). When an instruction commits, one or more entries of the RCQ 82 representing the register mappings generated by the rename circuitry 70 for any destination registers of the instruction are popped from the RCQ 82 and used to update the ART 78, which represents the register mappings at the latest commit point of execution (i.e. register mappings set for instructions which are now non-speculative). Also, any physical registers overwritten in the ART 78 based on the popped RCQ entries can normally be reclaimed for re-allocation at the point when they are no longer indicated in the ART 78. On a flush of instructions from the pipeline due to a mis-speculation event such as a branch misprediction, the register state can be rewound back to an earlier point in program flow by copying the ART 78 contents to the SRT 76 and then rebuilding the ART 78 based on RCQ entries associated with instructions between the commit point represented by the ART 78 and the flush point to which program execution had to be rewound to reach a point prior to the mis-speculation.

Hence, when a committed instruction causes an SRT entry mapping architectural register X to physical register Y to be overwritten such that architectural register X is now mapped to physical register Z, physical register Y can normally be freed for re-allocation since physical register Y is no longer needed for potentially restoring architectural state following a flush caused by a mis-speculation. Hence, reclaim condition detection circuitry 75 analyses the changes to the ART 78 triggered by committed RCQ entries, and may issue a signal for triggering an update to the "free status" in the free list 80 for a given physical register, when it is detected that the given physical register is overwritten in the ART 78.

However, in the approach in FIG. 7 the delay control circuitry 40 controls register protection delay circuitry 38 to provide an additional register protection delay period beyond the cycle in which the reclaim condition detection circuitry 75 determines that a given register can be freed for re-allocation. For example, the freelist update signal issued by reclaim condition detection circuitry 75 may first pass through delay circuitry 38 before being sent to the free list 80 to trigger updates to the free list. Hence, this provides an additional delay of a variable number of cycles (with the particular number of delay cycles selected based on feedback hints provided to the delay control circuitry 40 as discussed earlier) before a given physical register used as a source operand by one instruction can be freed for reallocation to be re-mapped to the destination architectural register for a later instruction. As this freeing of the given physical register would be a necessary action before any subsequent instruction can write to the given physical register after an earlier instruction read the given physical register, this additional delay therefore will increase the minimum number of cycles possible between two instructions which both read the same physical register when separated by an intervening instruction which writes to that same physical register. Therefore, this provides a longer window of time within which two instructions which both read the same physical register can be implicitly detected as having no intervening write to the register occurring between those instructions, giving a good window of opportunity for reusing the pre-processed operand data stored in buffer 20.

The front end feedback hint in this example may be issued by the rename circuitry 70 based on the number of registers indicated as free in the free list 80. If the number of free registers drops below a threshold (e.g. indicating there could be a risk of a stall in forward progress due to having insufficient free registers available), a hint indicating that the delay imposed by delay circuitry 38 could be reduced may be issued. In some examples, there may be a number of alternative thresholds defined, for example:

- if the number of free registers drops below a first threshold, a weak request for a shorter delay may be issued by the rename circuitry 70, which the delay control circuitry 40 may choose either to ignore (not reducing the number of cycles of the register protection delay period) or to follow (reducing the number of cycles of the register protection delay period).
- if the number of free registers drops below a second threshold (lower than the first threshold), a stronger request for a shorter delay period may be issued by the rename circuitry 70, with the delay control circuitry 40 not having any discretion to ignore this stronger type of request.

Otherwise, the operation of FIG. 7 is similar to that already described for FIG. 3, and components shown with the same reference numerals as in FIG. 3 are as already described.

Figure 8:
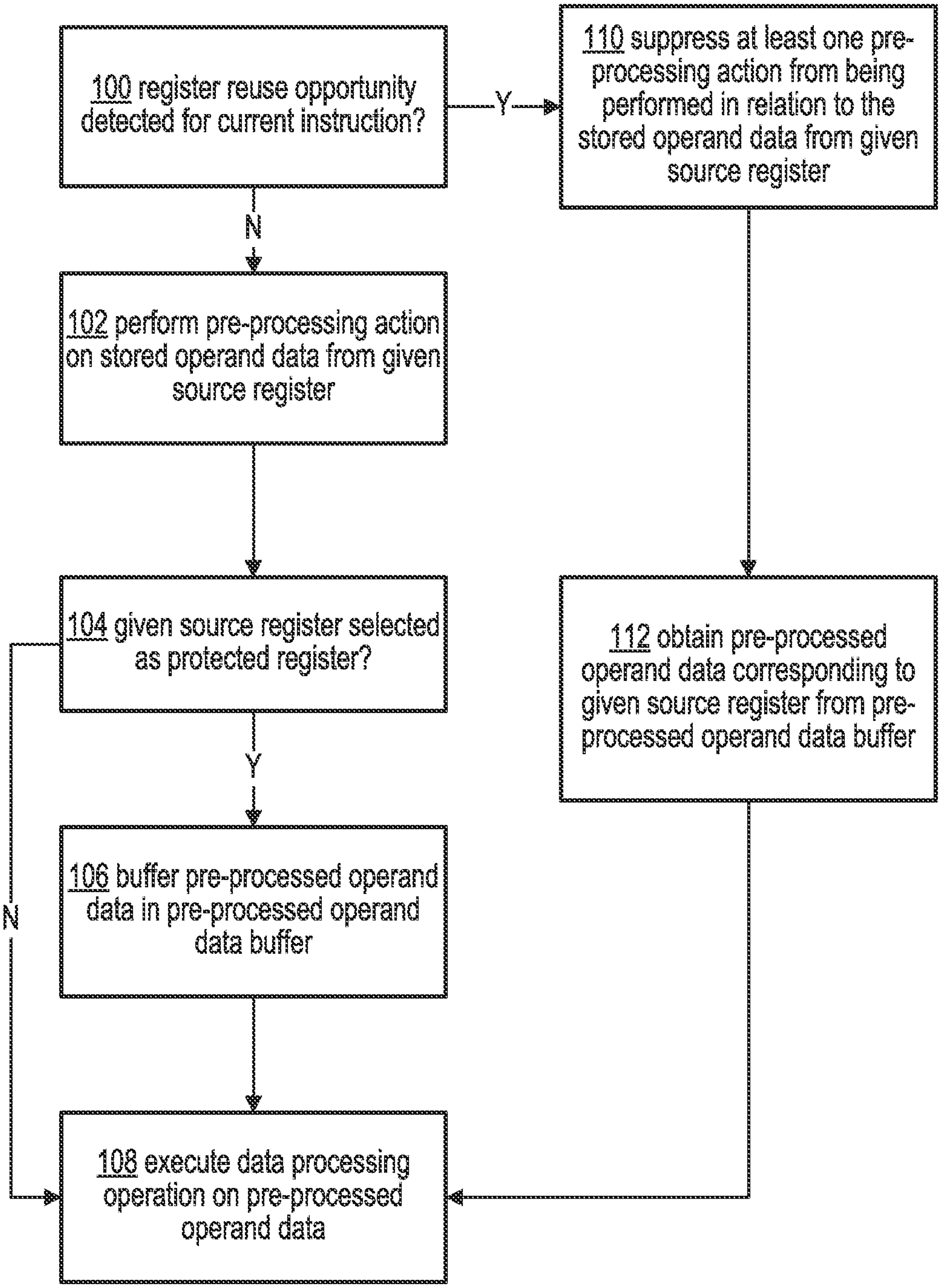
FIG. 8 illustrates steps for storing pre-processed operand data in a pre-processed operand data buffer and reusing the pre-processed operand data for a subsequent instruction.

FIG. 8 illustrates steps performed for enabling reuse of pre-processed operand data. At step 100, the register reuse detection circuitry 22 determines whether a register use opportunity is detected for the current instruction. If not, then at step 102 at least one pre-processing action is performed on stored operand data from a given source register of the register file 6. At step 104, the register reuse detection circuitry 22 determines whether the given source register is currently selected as a protected register by the register selection circuitry 44. If so, then at step 106 the pre-processed operand data obtained by performing the pre-processing action is buffered in the pre-processed operand data buffer 20. Regardless of whether the given source register is selected as the protected register, at step 108 the execution circuitry 4 executes a data processing operation on the pre-processed operand data.

On the other hand, if at step 100 a register reuse opportunity is detected for the current instruction, then at step 110 at least one pre-processing action is suppressed from being performed in relation to the stored operand data from the given source register. For example, as mentioned earlier, the reading of the stored operand data from the register file 6, assembly of read-out operand data into an operand by multiplexing circuitry 12, transfer of the operand across the integrated circuit to the execution circuitry 4, and/or operand re-formatting (e.g. Booth encoding) could be suppressed. At step 112, pre-processed operand data corresponding to the given source register is instead obtained from the pre-processed operand data buffer 20. At step 108, the data processing operation required by the instruction is then executed using the pre-processed operand data from buffer 20.

Regarding step 104, selection of which registers are protected registers is performed by the register selection circuitry 44. In one example, the register reuse detection circuitry 22 could issue a request for a given register to be a protected register, when detecting that an instruction of one of a number of instruction classes/types (e.g. outer product, multiple-vector long type instructions, multiple-vector indexed dot product, etc.) has specified the given register as a source register. There may be a certain maximum number of registers which can be designated as protected registers at a given time (e.g. 2, 3, or more). Hence, if the maximum number of registers are already protected, a replacement policy can be used to determine which of the previous registers designated as protected registers should be replaced with a newly requested register. For example, a least recently allocated protected register can be replaced with the register newly requested to be protected. Alternatively, a replacement policy based on information tracked by the instruction separation tracking circuitry 42 could be used (e.g. information could be maintained on the frequency which each protected register gets reused, to try to identify which registers are most useful to protect in future based on prioritising retention of protected registers which are reused more frequently).

Figure 9:
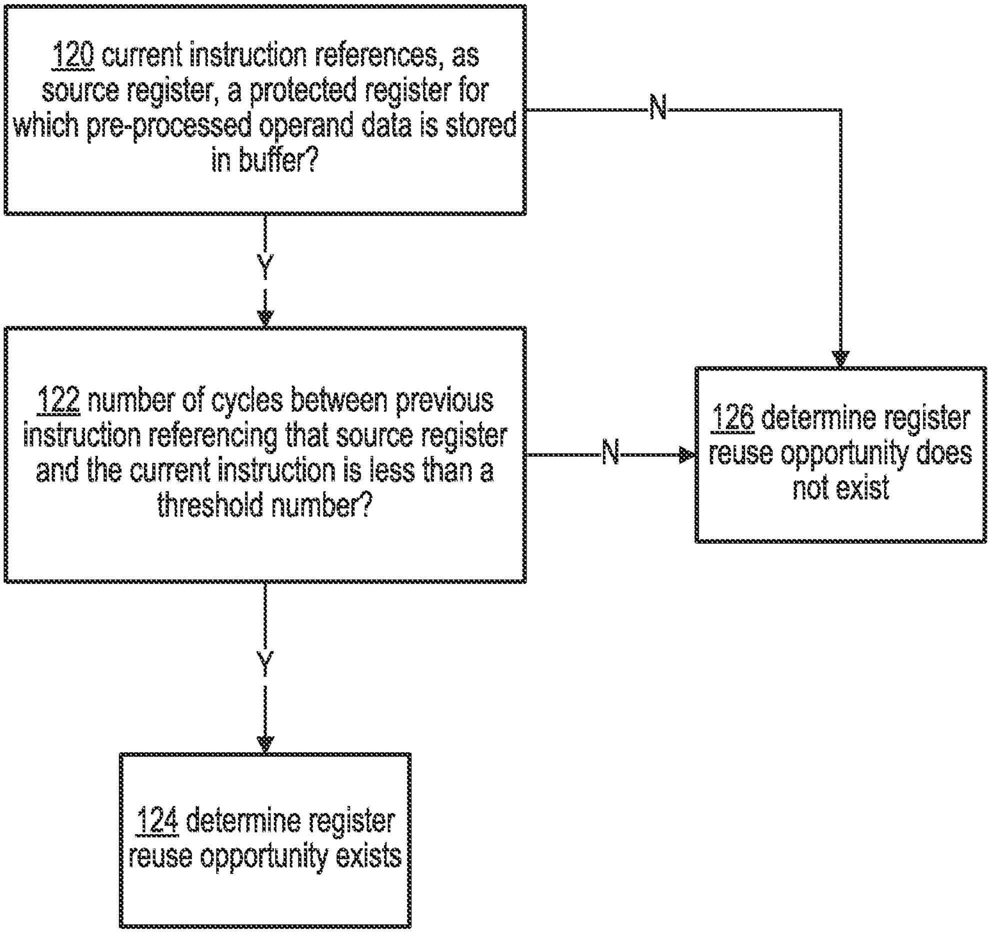
FIG. 9 illustrates steps for detecting whether a register reuse opportunity is available.

FIG. 9 illustrates steps for determining whether the register reuse opportunity exists at step 100 of FIG. 8. At step 120, the register reuse detection circuitry 22 determines whether the current instruction references, as a source register, a protected register for which pre-processed operand data is stored in the buffer 20. Also, at step 122, the register reuse detection circuitry 22 determines, based on the instruction separation tracking provided by instruction separation tracking circuitry 42 for the protected registers, whether the number of cycles separating the previous instruction referencing that source register from the current instruction is less than a threshold number. This threshold number corresponds to the minimum number of cycles possible between instructions A and C which read the same register and are separated by an intervening write B to the same register. For example, the threshold number may correspond to P+V, where P is a certain minimum number of cycles between instructions A and C even if delay circuitry 38 does not impose any additional delay, and V is the variable delay imposed by delay circuitry 38 as currently selected by delay control circuitry 40. If the current instruction references a protected register as its source register and the number of cycles between the previous instruction and current instruction referencing the same source register is less than the threshold, then at step 124 the register reuse opportunity is determined to exist. Otherwise, if either the current instruction does not reference a protected register as its source register, or the number of cycles between the previous instruction and current instruction is greater than or equal to the threshold, the register reuse detection circuitry 22 determines that the register reuse opportunity does not exist.

Figure 10:
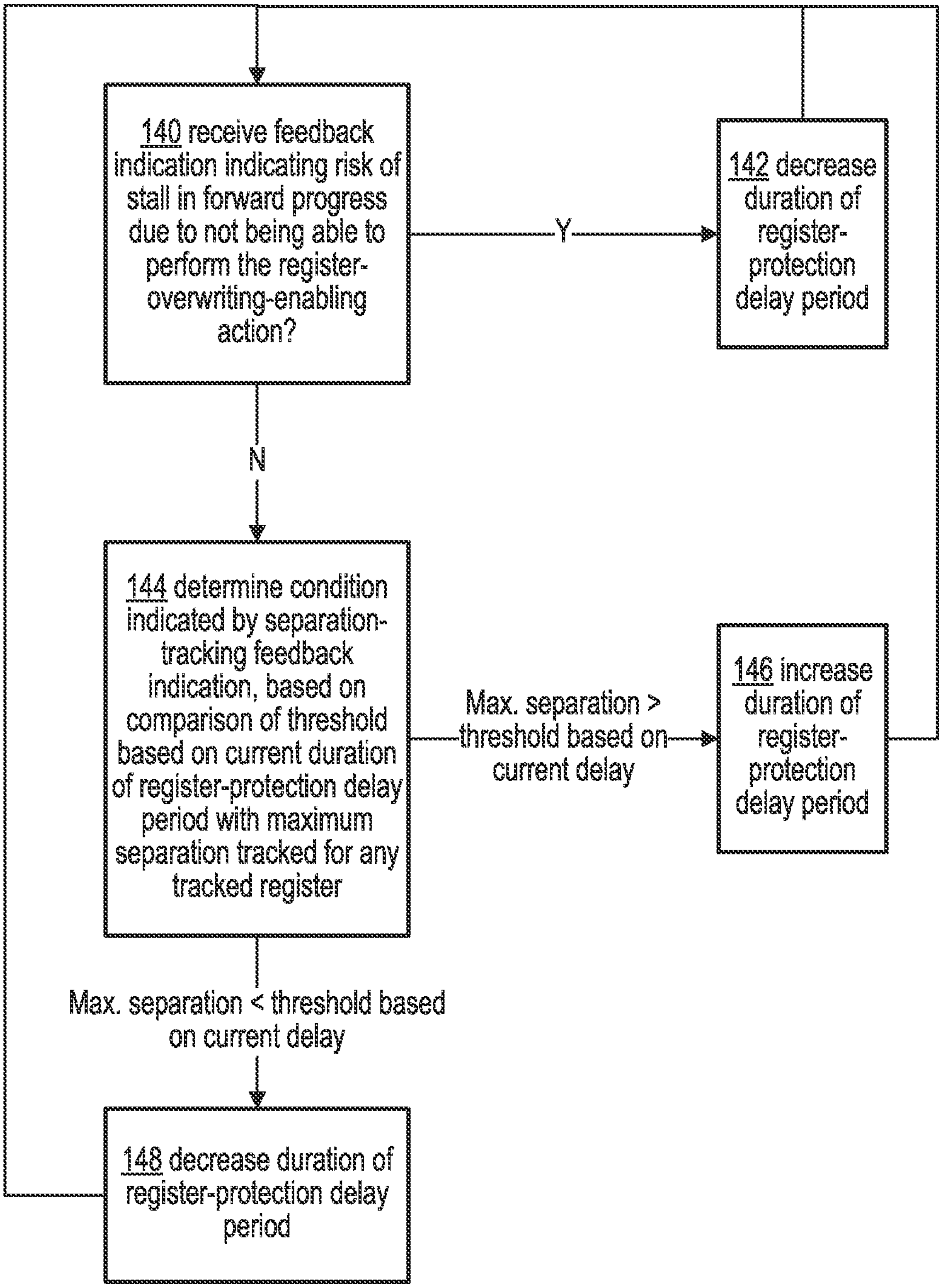
FIG. 10 illustrates steps for adjusting a duration of the register-protection delay period.

FIG. 10 illustrates steps for controlling the length of the register-protection delay period. At step 140, if the delay control circuitry 40 receives a feedback indication from the register-overwriting-enabling circuitry 34 (e.g. the issue circuitry 60 or the rename circuitry 70) indicating there is a risk of a stall in forward progress due to not being able to perform the register-overwriting-enabling action, then at step 142 the delay control circuitry 40 decreases the duration of the register-protection delay period. This reduces the likelihood of stalling in future due to not being able to issue instructions or free physical registers for re-allocation.

At step 144, the delay control circuitry 40 evaluates a condition based on the separation-tracking feedback indication from the instruction separation tracking circuitry (which is based on the separation tracking values maintained for each protected register, each separation tracking value indicating the number of cycles separating the most recent read of that register from the previous instruction reading that register). The separation-tracking feedback indication is based on a comparison of the maximum separation among the separations tracked by instruction separation tracking circuitry 42 for the respective protected registers and a threshold value dependent on the current delay period imposed by delay circuitry 38. If the separation-tracking feedback indication indicates that the maximum separation is greater than the threshold based on the current delay, then at step 146 the duration of the register-protection delay period is increased to increase the likelihood that on a future occasion two instructions reading the same register which are separated by that maximum separation number of cycles could benefit from the reuse of pre-processed operand data. However, if the separation-tracking feedback indication indicates that the maximum separation is less than a threshold based on the current delay, then at step 148 the duration of the register-protection delay period is decreased, as this would mean the current delay is longer than it needs to be to reflect the actual number of cycles between successive reads to the same register, so that performance can be improved by reducing the delay imposed on the register-overwriting-enabling action being performed (e.g. allowing subsequent instructions to issue earlier or allowing previously mapped physical registers to be reclaimed for re-allocation earlier).

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
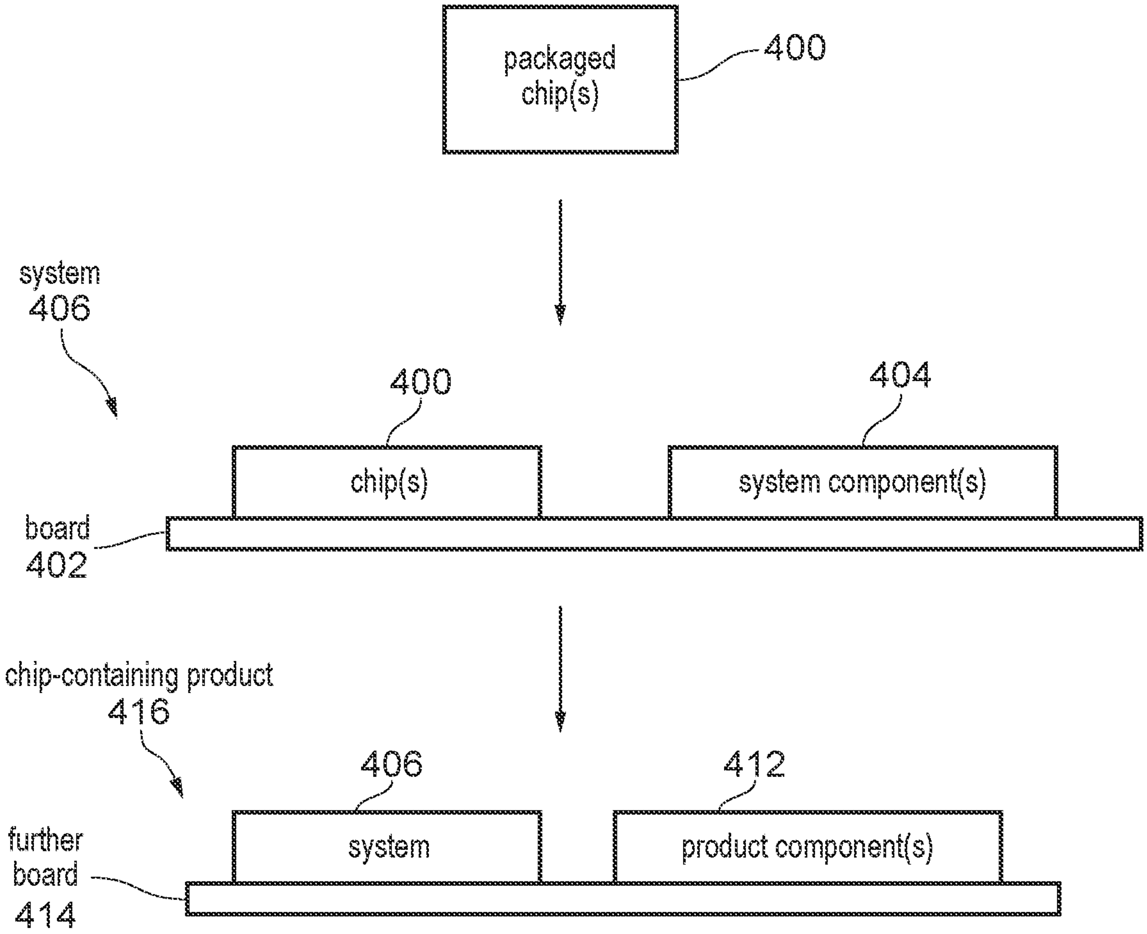
FIG. 11 illustrates a system and a chip-containing product.

As shown in FIG. 11, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   - a register file comprising a plurality of registers to store operand data for instructions;
   - execution circuitry to execute, in response to an instruction which references a given source register, a data processing operation on pre-processed oper- and data obtained after a pre-processing action has been performed using stored operand data from the given source register of the register file;

a pre-processed operand data buffer separate from the register file, the pre-processed operand data buffer being accessible to the execution circuitry and configured to store pre-processed operand data corresponding to a subset of the plurality of registers; and register reuse detection circuitry to:

detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register; and in response to detecting the register reuse opportunity, control the execution circuitry to execute the data processing operation for the subsequent instruction using the pre-processed operand data stored in the pre-processed operand data buffer corresponding to the reused source register, and suppress the pre-processing action from being performed for the subsequent instruction in relation to stored operand data from the reused source register of the register file.

2. The apparatus according to clause 1, in which the register reuse detection circuitry is configured to:

determine whether a number of cycles between the previous instruction referencing the reused source register and the subsequent instruction referencing the reused source register is less than a threshold number of cycles, and in response to determining that the number of cycles between the previous instruction and the subsequent instruction is less than the threshold number, determine that the register reuse opportunity exists for the subsequent instruction as it is guaranteed that no intervening instruction between the previous instruction and the subsequent instruction will cause a write to the reused source register.

3. The apparatus according to clause 2, in which the threshold number of cycles corresponds to a minimum number of cycles possible between two instructions which reference a same source register when those two instructions are separated by an intervening instruction which causes a write to that same source register.

4. The apparatus according to any preceding clause, comprising:

register-overwriting-enabling circuitry to perform a register-overwriting-enabling action required to have been performed after a read of a given register by an earlier instruction before it is possible that a later instruction could cause overwriting of the given register, where the register-overwriting-enabling action is dependent on at least one condition being satisfied; and register-protection-delaying circuitry to apply a register-protection delay period after the at least one condition is determined to be satisfied, to prevent the register-overwriting-enabling circuitry from performing the register-overwriting-enabling action for at least the register-protection delay period after the at least one condition has been determined to have been satisfied.

5. The apparatus according to clause 4, in which:

the register-overwriting-enabling circuitry comprises register rename circuitry to perform register renaming to map architectural register identifiers specified by instructions to physical register identifiers identifying the registers of the register file;

the register-overwriting-enabling action comprises the register rename circuitry re-mapping a given physical register identifier identifying the given register to a destination architectural register of a newly-renamed instruction after register reclaim circuitry has indicated that the given physical register identifier is free to be re-mapped to a new architectural register identifier; and the at least one condition comprises the register reclaim circuitry indicating that the freed physical register identifier is free to be re-mapped.

6. The apparatus according to clause 4, in which:

the register-overwriting-enabling circuitry comprises issue circuitry to issue instructions for execution;

the register-overwriting-enabling action comprises issue of the later instruction that overwrites the given register read by the earlier instruction; and the at least one criterion comprises the issue circuitry determining that, other than the register-protection-delay period not yet having elapsed, the later instruction is ready to be issued.

7. The apparatus according to any of clauses 4 to 6, in which the register-protection-delaying circuitry is configured to dynamically adjust a duration of the register-protection delay period based on at least one feedback indication.

8. The apparatus according to clause 7, in which, in response to a detecting a risk of a stall in forward progress due to not being able to perform the register-overwriting-enabling action for any instruction, the register-overwriting-enabling circuitry is configured to provide a feedback indication to request that the register-protection-delaying circuitry decreases the duration of the register-protection delay period.

9. The apparatus according to any of clauses 7 and 8, comprising instruction separation tracking circuitry to track, for at least one tracked register of the plurality of registers, a separation between successive instructions reading that tracked register; in which:

the register-protection-delaying circuitry is configured to adjust the duration of the register-protection delay period in response to a separation-tracking feedback indication depending on the separation tracked by the instruction separation tracking circuitry.

10. The apparatus according to clause 9, in which the separation-tracking feedback indication is dependent on a comparison between a threshold set based on a current duration of the register-protection delay period and a maximum separation tracked by the instruction separation tracking circuitry for any of the at least one tracked register.

11. The apparatus according to any of clauses 9 and 10, in which the at least one tracked register comprises the subset of registers for which the pre-processed operand data buffer stores the pre-processed operand data.

12. The apparatus according to any of clauses 1 to 11, comprising selection circuitry to select, as the subset of the plurality of registers for which the pre-processed operand data buffer stores the pre-processed operand data, one or more registers which are referenced as source registers by instructions of at least one predetermined class of instructions.

13. The apparatus according to any of clauses 1 to 12, in which the pre-processing action suppressed in response to detecting the register reuse opportunity comprises reading of the stored operand data from the given source register of the register file.

14. The apparatus according to any of clauses 1 to 13, in which the pre-processing action suppressed in response to detecting the register reuse opportunity comprises transfer of the stored operand data from the given source register to the execution circuitry.

15. The apparatus according to any of clauses 1 to 14, in which the pre-processing action suppressed in response to detecting the register reuse opportunity comprises re-formatting the stored operand data to generate the pre-processed operand data.

16. The apparatus according to clause 15, in which the re-formatting comprises Booth encoding operand data for a multiplication operation.

17. An apparatus comprising:
register rename circuitry to perform register renaming to map architectural register identifiers specified by instructions to physical register identifiers indicative of corresponding portions of hardware register storage;
register reclaim circuitry to determine when a previously allocated physical register identifier is free to be re-allocated to a new architectural register identifier specified by an instruction awaiting renaming;
reclaim delaying circuitry, responsive to the register reclaim circuitry indicating that a given physical register identifier is free to be re-allocated, to prevent the given physical register identifier actually being re-allocated during a protection delay period following the register reclaim circuitry indicating that the given physical register identifier is free to be re-allocated; and
protection delay period adjustment circuitry to dynamically adjust a duration of the protection delay period based on at least one feedback indication.

18. A system comprising:
the apparatus of any of clauses 1 to 17, implemented in at least one packaged chip;
at least one system component; and
a board,
wherein the at least one packaged chip and the at least one system component are assembled on the board.

19. A chip-containing product comprising the system of clause 18 assembled on a further board with at least one other product component.

20. Computer-readable code for fabrication of an apparatus comprising:
a register file comprising a plurality of registers to store operand data for instructions;
execution circuitry to execute, in response to an instruction which references a given source register, a data processing operation on pre-processed operand data obtained after a pre-processing action has been performed using stored operand data from the given source register of the register file;
a pre-processed operand data buffer separate from the register file, the pre-processed operand data buffer being accessible to the execution circuitry and configured to store pre-processed operand data corresponding to a subset of the plurality of registers; and
register reuse detection circuitry to:
detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register; and
in response to detecting the register reuse opportunity, control the execution circuitry to execute the data processing operation for the subsequent instruction using the pre-processed operand data stored in the pre-processed operand data buffer corresponding to the reused source register, and suppress the pre-processing action from being performed for the subsequent instruction in relation to stored operand data from the reused source register of the register file.

21. A computer-readable storage medium to store the computer-readable code of clause 20.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
a register file comprising a plurality of registers to store operand data for instructions;
execution circuitry to execute, in response to an instruction which references a given source register, a data processing operation on pre-processed operand data obtained after a pre-processing action has been performed using stored operand data from the given source register of the register file;
a pre-processed operand data buffer separate from the register file, the pre-processed operand data buffer being accessible to the execution circuitry and configured to store pre-processed operand data corresponding to a subset of the plurality of registers; and register reuse detection circuitry to:

detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register; and in response to detecting the register reuse opportunity, control the execution circuitry to execute the data processing operation for the subsequent instruction using the pre-processed operand data stored in the pre-processed operand data buffer corresponding to the reused source register, and suppress the pre-processing action from being performed for the subsequent instruction in relation to stored operand data from the reused source register of the register file, wherein the register reuse detection circuitry is configured to:

determine whether a number of cycles between the previous instruction referencing the reused source register and the subsequent instruction referencing the reused source register is less than a threshold number of cycles, and in response to determining that the number of cycles between the previous instruction and the subsequent instruction is less than the threshold number, determine that the register reuse opportunity exists for the subsequent instruction as the number of cycles being less than the threshold number guarantees that no intervening instruction between the previous instruction and the subsequent instruction will cause a write to the reused source register.

2. The apparatus according to claim 1, in which the threshold number of cycles corresponds to a minimum number of cycles possible between two instructions which reference a same source register when those two instructions are separated by an intervening instruction which causes a write to that same source register.

3. The apparatus according to claim 1, comprising:

register-overwriting-enabling circuitry to perform a register-overwriting-enabling action required to have been performed after a read of a given register by an earlier instruction before it is possible that a later instruction could cause overwriting of the given register, where the register-overwriting-enabling action is dependent on at least one condition being satisfied; and register-protection-delaying circuitry to apply a register-protection delay period after the at least one condition is determined to be satisfied, to prevent the register-overwriting-enabling circuitry from performing the register-overwriting-enabling action for at least the register-protection delay period after the at least one condition has been determined to have been satisfied.

4. The apparatus according to claim 3, in which:

the register-overwriting-enabling circuitry comprises register rename circuitry to perform register renaming to map architectural register identifiers specified by instructions to physical register identifiers identifying the registers of the register file;

the register-overwriting-enabling action comprises the register rename circuitry re-mapping a given physical register identifier identifying the given register to a destination architectural register of a newly-renamed instruction after register reclaim circuitry has indicated that the given physical register identifier is free to be re-mapped to a new architectural register identifier; and the at least one condition comprises the register reclaim circuitry indicating that the freed physical register identifier is free to be re-mapped.

5. The apparatus according to claim 3, in which:

the register-overwriting-enabling circuitry comprises issue circuitry to issue instructions for execution;

the register-overwriting-enabling action comprises issue of the later instruction that overwrites the given register read by the earlier instruction; and the at least one condition comprises the issue circuitry determining that, other than the register-protection-delay period not yet having elapsed, the later instruction is ready to be issued.

6. The apparatus according to claim 3, in which the register-protection-delaying circuitry is configured to dynamically adjust a duration of the register-protection delay period based on at least one feedback indication.

7. The apparatus according to claim 6, in which, in response to a detecting a risk of a stall in forward progress due to not being able to perform the register-overwriting-enabling action for any instruction, the register-overwriting-enabling circuitry is configured to provide a feedback indication to request that the register-protection-delaying circuitry decreases the duration of the register-protection delay period.

8. The apparatus according to claim 6, comprising instruction separation tracking circuitry to track, for at least one tracked register of the plurality of registers, a separation between successive instructions reading that tracked register; in which:

the register-protection-delaying circuitry is configured to adjust the duration of the register-protection delay period in response to a separation-tracking feedback indication depending on the separation tracked by the instruction separation tracking circuitry.

9. The apparatus according to claim 8, in which the separation-tracking feedback indication is dependent on a comparison between a threshold set based on a current duration of the register-protection delay period and a maximum separation tracked by the instruction separation tracking circuitry for any of the at least one tracked register.

10. The apparatus according to claim 8, in which the at least one tracked register comprises the subset of registers for which the pre-processed operand data buffer stores the pre-processed operand data.

11. The apparatus according to claim 1, comprising selection circuitry to select, as the subset of the plurality of registers for which the pre-processed operand data buffer stores the pre-processed operand data, one or more registers which are referenced as source registers by instructions of at least one predetermined class of instructions.

12. The apparatus according to claim 1, in which the pre-processing action suppressed in response to detecting the register reuse opportunity comprises reading of the stored operand data from the given source register of the register file.

13. The apparatus according to claim 1, in which the pre-processing action suppressed in response to detecting the register reuse opportunity comprises transfer of the stored operand data from the given source register to the execution circuitry.

14. The apparatus according to claim 1, in which the pre-processing action suppressed in response to detecting the register reuse opportunity comprises re-formatting the stored operand data to generate the pre-processed operand data.

15. The apparatus according to claim 14, in which the re-formatting comprises Booth encoding operand data for a multiplication operation.

16. A system comprising:

the apparatus of claim 1, implemented in at least one packaged chip;

at least one system component; and a board, wherein the at least one packaged chip and the at least one system component are assembled on the board.

17. A chip-containing product comprising the system of claim 16 assembled on a further board with at least one other product component.

18. An apparatus comprising:

register rename circuitry to perform register renaming to map architectural register identifiers specified by instructions to physical register identifiers indicative of corresponding portions of hardware register storage;

register reclaim circuitry to determine when a previously allocated physical register identifier is free to be re-allocated to a new architectural register identifier specified by an instruction awaiting renaming;

reclaim delaying circuitry, responsive to the register reclaim circuitry indicating that a given physical register identifier is free to be re-allocated, to prevent the given physical register identifier actually being re-allocated during a protection delay period following the register reclaim circuitry indicating that the given physical register identifier is free to be re-allocated; and protection delay period adjustment circuitry to dynamically adjust a duration of the protection delay period based on at least one feedback indication.

19. A non-transitory computer-readable medium to store computer-readable code for fabrication of an apparatus comprising:

a register file comprising a plurality of registers to store operand data for instructions;

execution circuitry to execute, in response to an instruction which references a given source register, a data processing operation on pre-processed operand data obtained after a pre-processing action has been performed using stored operand data from the given source register of the register file;

a pre-processed operand data buffer separate from the register file, the pre-processed operand data buffer being accessible to the execution circuitry and configured to store pre-processed operand data corresponding to a subset of the plurality of registers; and register reuse detection circuitry to:

detect a register reuse opportunity for a subsequent instruction which references a reused source register also referenced by a previous instruction for which pre-processed operand data corresponding to the reused source register was written to the pre-processed operand data buffer, when it is guaranteed that no intervening instruction between the previous instruction and the subsequent instruction will cause a write to the reused source register; and in response to detecting the register reuse opportunity, control the execution circuitry to execute the data processing operation for the subsequent instruction using the pre-processed operand data stored in the pre-processed operand data buffer corresponding to the reused source register, and suppress the pre-processing action from being performed for the subsequent instruction in relation to stored operand data from the reused source register of the register file, wherein the register reuse detection circuitry is configured to:

determine whether a number of cycles between the previous instruction referencing the reused source register and the subsequent instruction referencing the reused source register is less than a threshold number of cycles, and in response to determining that the number of cycles between the previous instruction and the subsequent instruction is less than the threshold number, determine that the register reuse opportunity exists for the subsequent instruction as the number of cycles being less than the threshold number guarantees that no intervening instruction between the previous instruction and the subsequent instruction will cause a write to the reused source register.

* * * * *